(12) United States Patent
Kinoshita

(10) Patent No.: US 8,681,238 B2
(45) Date of Patent: Mar. 25, 2014

(54) IMAGE PROCESSING DEVICE, METHOD AND PROGRAM

(75) Inventor: Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 481 days.

(21) Appl. No.: 13/023,866

(22) Filed: Feb. 9, 2011

(65) Prior Publication Data

US 2011/0242347 A1 Oct. 6, 2011

(30) Foreign Application Priority Data

Mar. 30, 2010 (JP) ................................. 2010-079186

(51) Int. Cl.
*H04N 5/235* (2006.01)
(52) U.S. Cl.
USPC .................. 348/222.1; 348/240.2; 348/208.6; 348/333.12
(58) Field of Classification Search
USPC .......... 348/220.1, 222.1, 240.1, 240.2, 208.6, 348/333.12
See application file for complete search history.

(56) References Cited

U.S. PATENT DOCUMENTS

2005/0231625 A1* 10/2005 Parulski et al. .......... 348/333.12
2006/0238622 A1* 10/2006 Shimosato ................ 348/220.1
2006/0279555 A1* 12/2006 Ono ............................. 345/173
2011/0032372 A1* 2/2011 Uemura et al. ............ 348/220.1
2011/0080504 A1* 4/2011 Akahori ..................... 348/240.2

FOREIGN PATENT DOCUMENTS

JP 2007-316957 * 6/2007
JP 2007-316957 12/2007

OTHER PUBLICATIONS

U.S. Appl. No. 12/983,516, filed Jan. 3, 2011, Kinoshita, et al.
U.S. Appl. No. 13/321,395, filed Nov. 18, 2011, Kinoshita, et al.

* cited by examiner

*Primary Examiner* — James Hannett
*Assistant Examiner* — Yih-Sien Kao
(74) *Attorney, Agent, or Firm* — Oblon, Spivak, McClelland, Maier & Neustadt, L.L.P.

(57) ABSTRACT

An image processing device includes a recording control unit that controls recording of an image of a predetermined frame among images of a plurality of consecutive frames, a trim box setting unit that sets a plurality of trim boxes containing a subject area which is an area of a subject of interest in the image of the predetermined frame recorded by the recording control unit, and a generation control unit that controls generation of the plurality of trim images from the image of the predetermined frame recorded by the recording control unit, based on the plurality of trim boxes set by the trim box setting unit.

6 Claims, 34 Drawing Sheets

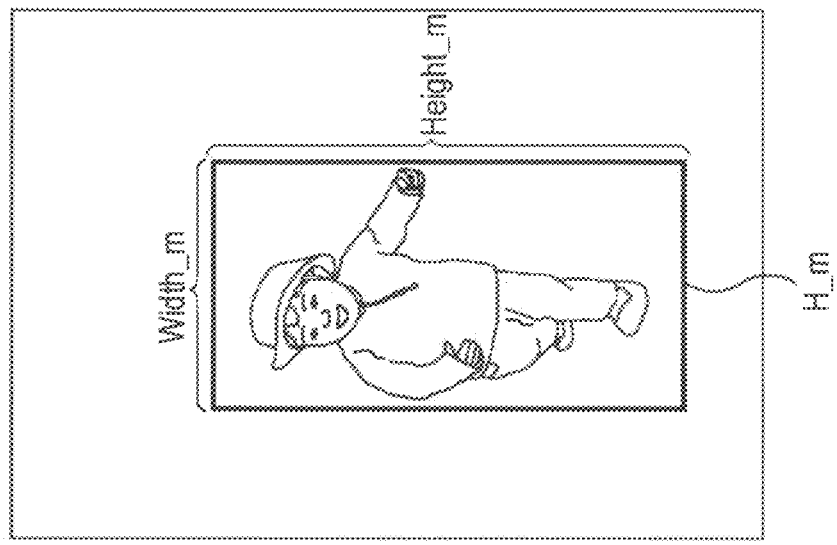
FIG. 30
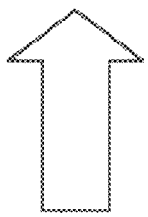
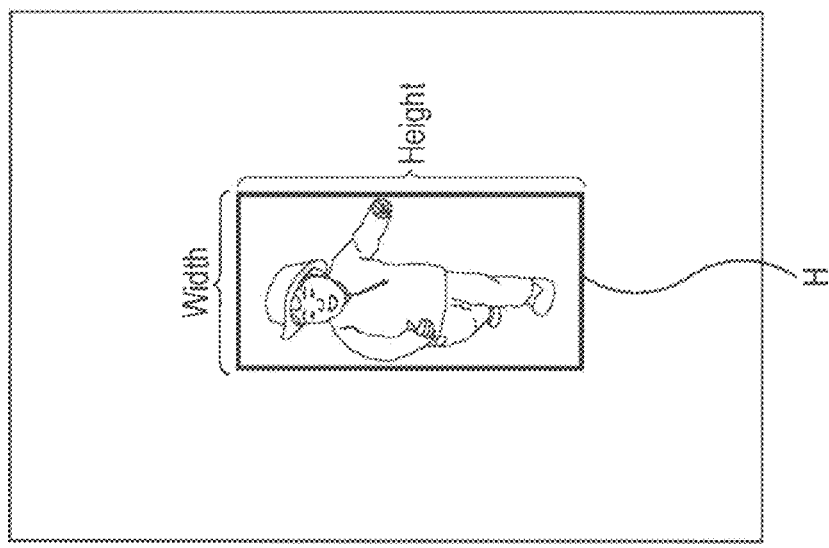

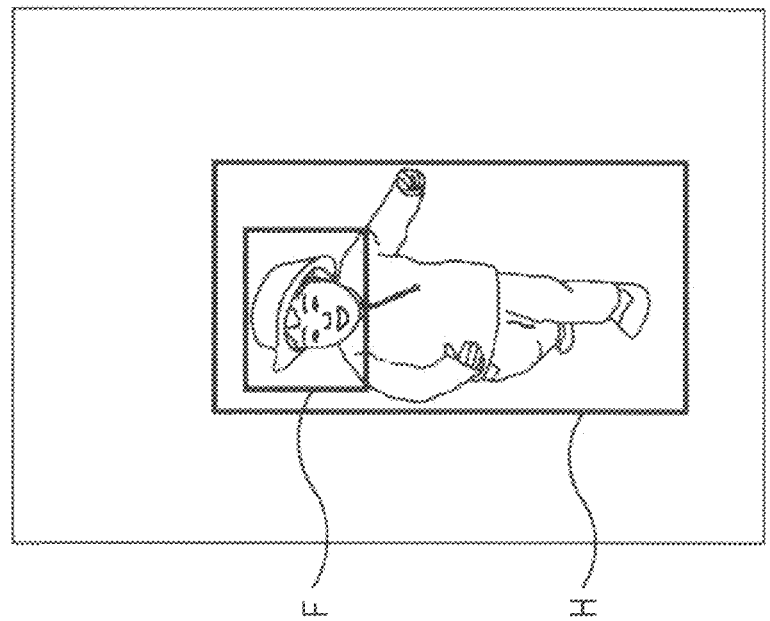
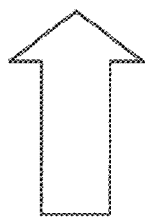
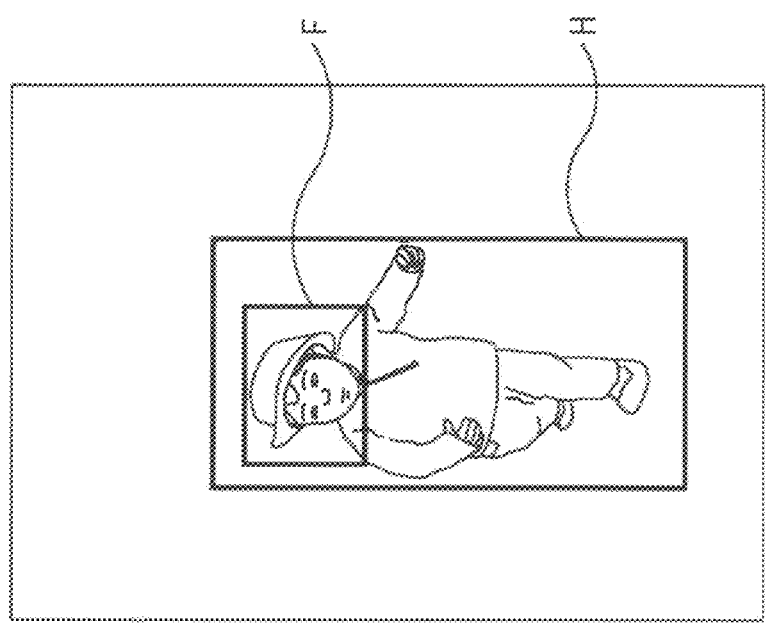
FIG. 34

IMAGE PROCESSING DEVICE, METHOD AND PROGRAM

BACKGROUND OF THE INVENTION

1. Field of the Invention

The present invention relates to an image processing device, a method and a program, and more particularly to an image processing device, a method and a program, capable of providing suitable trim images without inconvenient operations or advanced techniques.

2. Description of the Related Art

In recent years, there has been proposed a technique where in an image capturing device such as a digital still camera, an image of a subject is captured while detecting the subject such as a figure or a face using a detector, and a trim box is set such that an area of the detected subject is centered on a trim image in the captured image (see Japanese Unexamined Patent Application Publication No. 2007-316957).

SUMMARY OF THE INVENTION

However, in the technique disclosed in Japanese Unexamined Patent Application Publication No. 2007-316957, only a trim image where a subject is arranged around the center is generally obtained. In this way, the composition where the subject is arranged at the center of the image is hardly a good composition and tends to lack fun.

A suitable composition differs according to not only the movement of a subject, the background, and what kind of a subject is selected as a primary theme, but also the preferences of a user.

In order to obtain trim images in various compositions, it is necessary to capture images taking trimming into consideration; however, it is easy for a user who is used to image capturing, but it is not easy for beginners.

It is desirable to provide suitable trim images without inconvenient operations or advanced techniques.

According to an embodiment of the present invention, there is an image processing device including a recording control means that controls the recording of an image of a predetermined frame among images of a plurality of consecutive frames; a trim box setting means that sets a plurality of trim boxes containing a subject area which is an area of a subject of interest in the image of the predetermined frame recorded by the recording control means; and a generation control means that controls the generation of a plurality of trim images from the image of the predetermined frame recorded by the recording control means, based on the plurality of trim boxes set by the trim box setting means.

The image processing device may further include an image capturing means that captures an image of a subject; and an instruction means that instructs the image capturing means to capture the image of the predetermined frame when the subject area is positioned around the center of the image of the predetermined frame in the image of the predetermined frame, wherein the recording control means controls the recording of the image of the predetermined frame captured by the image capturing means in response to the instruction from the instruction means.

The trim box setting means may set the number of trim boxes according to at least one of the size or the position of the subject area in the image of the predetermined frame recorded by the recording control means.

The trim box setting means may set the smaller number of trim boxes if the subject area is larger than the image, and set the larger number of trim boxes if the subject area is smaller than the image, in the image of the predetermined frame.

The image processing device may further include a determination means that determines the facial expression of a figure if the subject is a human figure, wherein the trim box setting means sets the number of trim boxes according to the facial expression determined by the determination means and the position of the subject area, in the image of the predetermined frame.

The trim box setting means may set the plurality of trim boxes in the image of the predetermined frame recorded by the recording control means such that the position of the subject area comes to a predetermined position in a composition decided in advance in the trim image.

According to an embodiment of the present invention, there is provided an image processing method for an image processing device including a recording control means that controls the recording of an image of a predetermined frame among images of a plurality of consecutive frames; a trim box setting means that sets a plurality of trim boxes containing the subject area which is an area of a subject of interest in the image of the predetermined frame recorded by the recording control means; and a generation control means that controls the generation of the plurality of trim images from the image of the predetermined frame recorded by the recording control means, based on the plurality of trim boxes set by the trim box setting means, the method including the steps of causing the recording control means to control the recording of an image of a predetermined frame among images of the plurality of consecutive frames; causing the trim box setting means to set the plurality of trim boxes containing a subject area which is an area of a subject of interest in the image of the predetermined frame recorded in the recording control step; and causing the generation control means to control the generation of the plurality of trim images from the image of the predetermined frame recorded in the recording control step, based on the plurality of trim boxes set in the trim box setting step.

According to an embodiment of the present invention, there is provided a program enabling a computer to perform the steps of controlling the recording of an image of a predetermined frame among images of a plurality of consecutive frames; setting a plurality of trim boxes containing a subject area which is an area of a subject of interest in the image of the predetermined frame recorded in the recording control step; and controlling the generation of the plurality of trim images from the image of the predetermined frame recorded in the recording control step, based on the plurality of trim boxes set in the trim box setting step.

According to an embodiment of the present invention, the recording of an image of a predetermined frame among images of a plurality of consecutive frames is controlled, a plurality of trim boxes containing a subject area which is an area of a subject of interest in the recorded image of the predetermined frame are set, and the generation of the plurality of trim images from the image of the predetermined frame recorded in the recording control step is controlled based on the set plurality of trim boxes.

According to the present invention, it is possible to provide suitable trim images without inconvenient operations or advanced techniques.

BRIEF DESCRIPTION OF THE DRAWINGS

FIG. 30 is a diagram illustrating the size of a subject area.

FIG. 34 is a diagram illustrating the detection of a facial expression.

DESCRIPTION OF THE PREFERRED EMBODIMENTS

Figure 1:
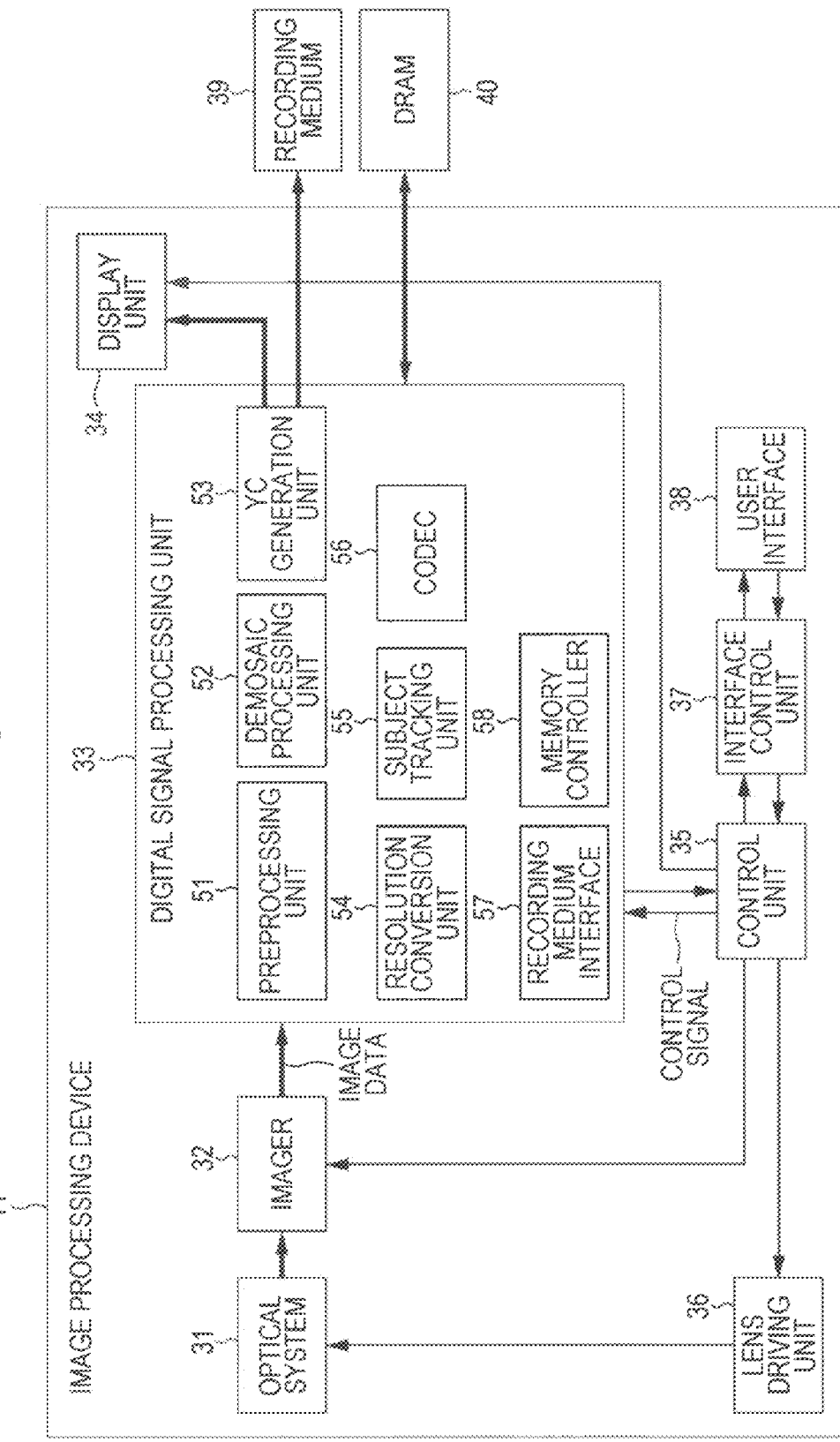
FIG. 1 is a block diagram illustrating a configuration example of an image processing device according to an embodiment of the present invention.

Hereinafter, embodiments of the present invention will be described with reference to the accompanying drawings.
Configuration Example of Image Processing Device FIG. 1 is a diagram illustrating a configuration example of an image processing device according to an embodiment of the present invention.

The image processing device 11 may be provided in an image capturing device such as a digital video camera or a digital still camera which captures images of, for example, a moving subject.

The image processing device 11 includes an optical system 31, an imager 32, a digital signal processing unit 33, a display unit 34, a control unit 35, a lens driving unit 36, an interface control unit 37, and a user interface 38. Also, the image processing device 11 is connected to a recording medium 39 and a DRAM (dynamic random access memory) 40.

The optical system 31 is constituted by an optical system including imaging lenses (not shown). Light incident on the optical system 31 undergoes photoelectric conversion in the imager 32 including imaging elements such as a CCD (charge coupled device). An electric signal (analog signal) generated through the photoelectric conversion in the imager 32 is converted into image data (hereinafter, appropriately referred to as raw data) of a digital signal by an A/D (analog to digital) conversion unit (not shown) and then is supplied to the digital signal processing unit 33.

The digital signal processing unit 33 performs a predetermined signal process for the image data (raw data) from the imager 32. The digital signal processing unit 33 includes a preprocessing unit 51, a demosaic processing unit 52, a YC generation unit 53, a resolution conversion unit 54, a subject tracking unit 55, a codec 56, a recording medium interface 57, and a memory controller 58.

The preprocessing unit 51 performs a clamp process for clamping the black level of R, G, and B to a predetermined level or a correction process between the color channels of R, G, and B, for the image data from the imager 32, as a preprocess. The demosaic processing unit 52 performs, for the image data preprocessed by the preprocessing unit 51, a demosaic process for supplementing color components of pixels such that each pixel of the image data has all the color components of R, G, and B.

The YC generation unit 53 generates (divides) a luminance (Y) signal and a color (C) signal from the image data of R, G, and B which have undergone the demosaic process in the demosaic processing unit 52. The resolution conversion unit 54 performs a resolution conversion process for the image data processed by the YC generation unit 53.

The subject tracking unit 55 performs a subject tracking process for detecting and tracking a subject in an input image corresponding to the image data, based on the image data including the luminance signal and the color signal generated by the YC generation unit 53.

Here, the detection of the subject is performed assuming that when a user has a glance at the input image, an object on the input image which is estimated to interest the user, that is, an object which is estimated as the user facing the object, is the subject. Therefore, the subject is not limited to figures.

The subject tracking unit 55 supplies data regarding a subject box indicating an area containing the subject in the input image, which has been obtained as a result of the subject tracking process, to the control unit 35. Details of the subject tracking unit 55 will be described later with reference to FIG. 2.

The codec 56 optionally codes the image data generated by the YC generation unit 53 or the resolution conversion unit 54 or the image data recorded in the DRAM 40 and records the coded images in the recording medium 39 via the recording medium interface 57, or decodes decoded image data. The image data which has been coded by the codec 56 or the image data obtained by the resolution conversion unit 54 is supplied to the display unit 34 and displayed. The display unit 34 includes, for example, a liquid crystal display, and displays an input image corresponding to the image data supplied from the digital signal processing unit 33 under the control of the control unit 35.

The recording medium interface 57 makes the image data coded by the codec 56 to be recorded in the recording medium 39 under the control of the control unit 35. The recording medium interface 57 is supplied with image data which is read from the DRAM 40 by the memory controller 58 and undergoes a predetermined signal process, so as to be recorded in the recording medium 39, in addition to, for example, the image data coded by the codec 56.

The memory controller 58 records the image data (raw data) generated by the YC generation unit 53 or the resolution conversion unit 54 in the DRAM 40, reads the raw data from the DRAM 40 and supplies the raw data to each unit of the digital signal processing unit 33, under the control of the control unit 35.

The control unit 35 controls the respective units of the image processing device 11 in response to the control signals supplied from the interface control unit 37.

For example, the control unit 35 supplies parameters and the like used for various kinds of signal processes to the digital signal processing unit 33, and obtains data as a result of the various kinds of signal processes from the digital signal processing unit 33 so as to supply to the interface control unit 37.

Further, the control unit 35 displays a subject box on an input image which is displayed on the display unit 34 based on the data, from the subject tracking unit 55, regarding the subject box indicating the area containing the subject in the input image.

The control unit 35 supplies control signals for driving the imaging lenses constituting the optical system 31 or controlling apertures and the like, to the lens driving unit 36. The control unit 35 also controls the imager 32 to capture an input image.

The user interface 38 includes input devices such as buttons, levers, switches, or microphones which are operated such that a user inputs instructions to the image processing device 11, and output devices such as lamps or speakers which present information to the user.

For example, if the buttons as the user interface 38 are operated, the user interface 38 supplies a control signal corresponding to the operation to the control unit 35 via the interface control unit 37.

The recording medium 39 may be a recording medium which is attachable to and detachable from the image processing device 11, such as a tape, a DVD (digital versatile disc), or a memory card, or may be a fixed recording medium which is embedded in the image processing device 11, such as a hard disc.

The DRAM 40 appropriately records the image data (raw data) generated in the digital signal processing unit 33.

Configuration Example of Subject Tracking Unit

Next, a configuration example of the subject tracking unit 55 in FIG. 1 will be described with reference to FIG. 2.

Figure 2:
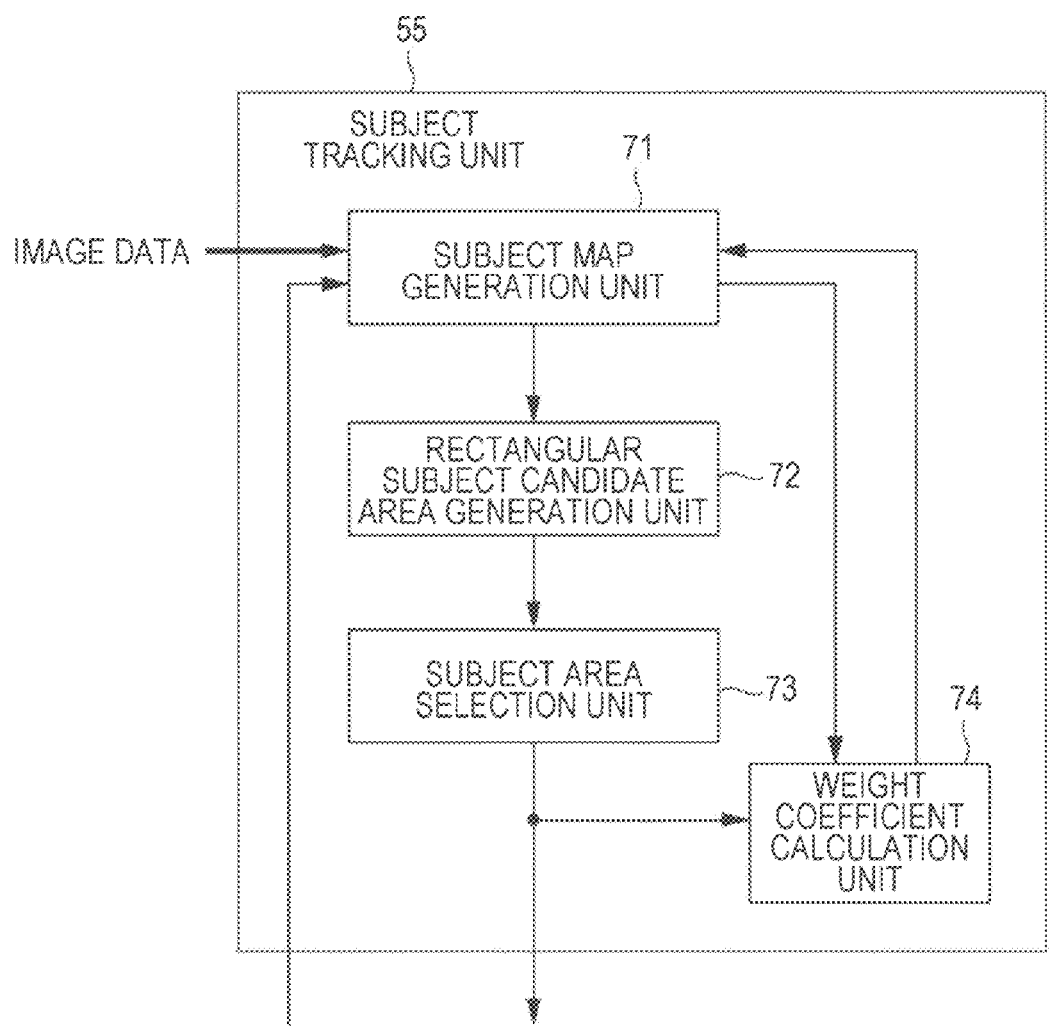
FIG. 2 is a block diagram illustrating a configuration example of a subject tracking unit.

The subject tracking unit 55 in FIG. 2 includes a subject map generation unit 71, a rectangular subject candidate area generation unit 72, a subject area selection unit 73, and a weight coefficient calculation unit 74.

The subject map generation unit 71 generates a feature amount map indicating the feature amount in a predetermined area of a predetermined frame of the input image for each feature such as the luminance or the color of the input image, and supplies the feature amount map to the weight coefficient calculation unit 74. Also, the subject map generation unit 71 generates a subject map indicating an area of the subject in the input image based on the generated feature amount map and a weight coefficient for each feature amount supplied from the weight coefficient calculation unit 74.

More specifically, the subject map generation unit 71 weight adds information (feature amount) regarding each area of the feature amount map for each feature for each area placed at the same position, thereby generating a subject map. The subject map generation unit 71 supplies the generated subject map to the rectangular subject candidate area generation unit 72.

In addition, in each of the feature amount maps, an area on the input image corresponding to an area having a larger amount of information, that is, an area having a large feature amount becomes an area having a higher possibility of containing the subject, and thus an area containing the subject in the input image can be specified using each of the feature amount maps.

The rectangular subject candidate area generation unit 72 obtains an area which is a candidate of the subject in the subject map from the subject map generation unit 71, that is, a rectangular area including an area having a large amount of information in the subject map, and supplies coordinate information indicating coordinates of the rectangular area to the subject area selection unit 73. The rectangular subject candidate area generation unit 72 calculates information regarding the rectangular area (hereinafter, referred to as area information) indicated by the coordinate information on the subject map, and correlates the area information with the coordinate information so as to be supplied to the subject area selection unit 73.

The subject area selection unit 73 selects a subject area which is a rectangular area containing the subject of interest which is a tracking target, from inside the rectangular area, based on the area information from the rectangular subject candidate area generation unit 72, and supplies the coordinate information regarding the subject area to the control unit 35 (FIG. 1) and the weight coefficient calculation unit 74.

The weight coefficient calculation unit 74 calculates a weight coefficient for weighting a feature amount map for a next frame corresponding to a relatively large feature amount among feature amounts in an area corresponding to the subject area on each of the feature amount maps for a certain frame from the subject map generation unit 71, and supplies the calculated weight coefficient to the subject map generation unit 71.

Due to this configuration, the subject tracking unit 55 can obtain a subject box indicating a subject area for each frame of the input image.

Configuration Example of Subject Map Generation Unit

A configuration example of the subject map generation unit 71 in FIG. 2 will be described with reference to FIG. 3.

Figure 3:
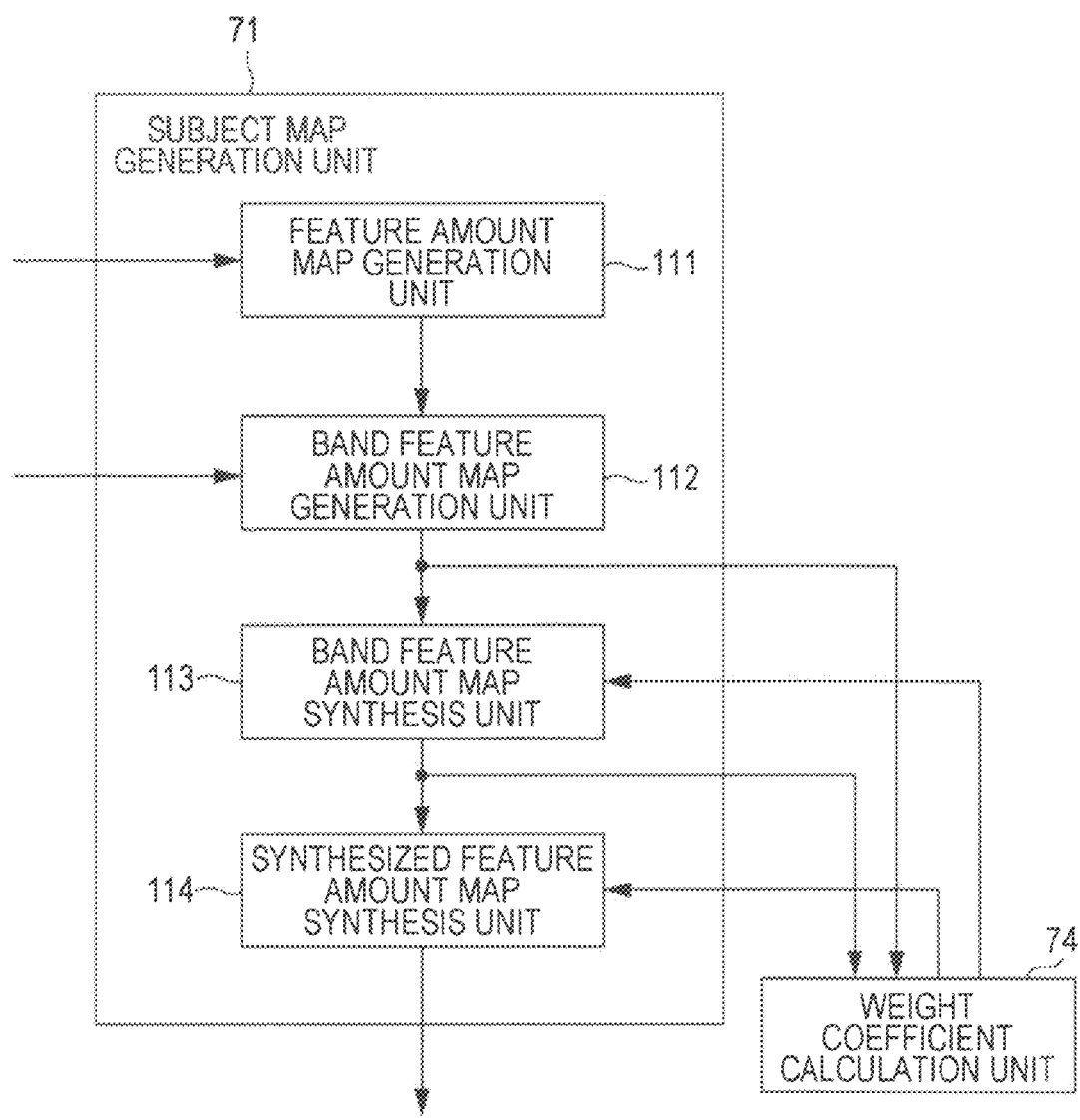
FIG. 3 is a block diagram illustrating a configuration example of a subject map generation unit.

The subject map generation unit 71 in FIG. 3 includes a feature amount map generation unit 111, a band feature amount map generation unit 112, a band feature amount map synthesis unit 113, and a synthesized feature amount map synthesis unit 114.

The feature amount map generation unit 111 generates a feature amount map indicating information (feature amount) regarding a feature such as the luminance or the color from a certain frame of the input image, for each feature amount, so as to be supplied to the band feature amount map generation unit 112.

The band feature amount map generation unit 112 extracts feature amounts of predetermined band components for the number of predetermined times from the feature amounts of the respective feature amount maps from the feature amount map generation unit 111, and generates the band feature amount indicating the extracted feature amounts so as to be supplied to the weight coefficient calculation unit 74 and the band feature amount map synthesis unit 113.

The band feature amount map synthesis unit 113 generates a synthesized feature amount map by synthesizing the band feature amount maps from the band feature amount map generation unit 112 for each feature amount based on the weight coefficient from the weight coefficient calculation unit 74, and supplies the synthesized feature amount map to the weight coefficient calculation unit 74 and the synthesized feature amount map synthesis unit 114.

The synthesized feature amount map synthesis unit 114 generates a subject map by synthesizing the synthesized feature amount maps from the band feature amount map synthesis unit 113 based on the weight coefficient from the weight coefficient calculation unit 74, so as to be supplied to the rectangular subject candidate area generation unit 72 (FIG. 2).

Hereinafter, the band feature amount map and the synthesized feature amount map are simply referred to as a feature amount map.

Configuration Example of Rectangular Subject Candidate Area Generation Unit

Next, with reference to FIG. 4, a configuration example of the rectangular subject candidate area generation unit 72 in FIG. 2 will be described.

Figure 4:
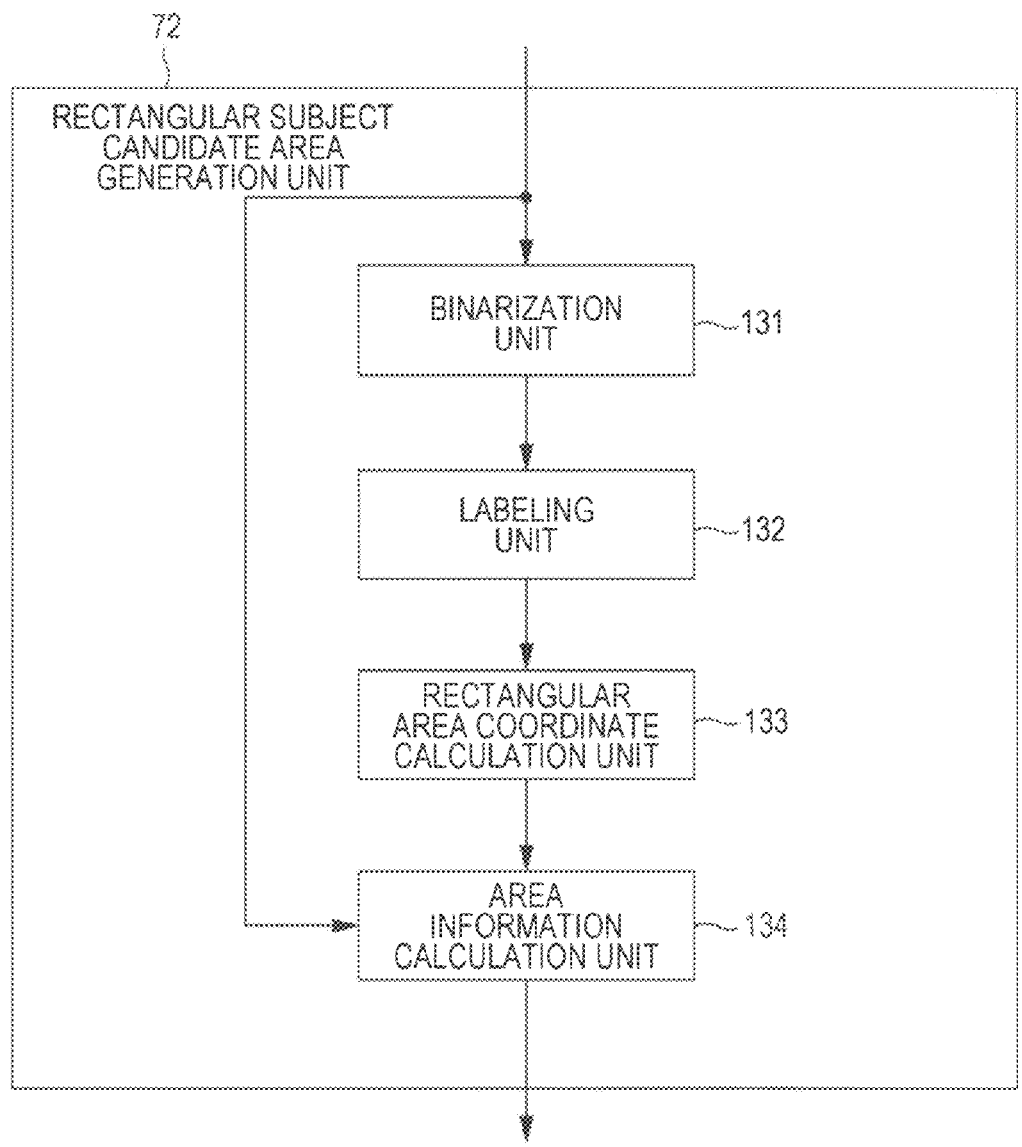
FIG. 4 is a block diagram illustrating a configuration example of a rectangular subject candidate area generation unit.

The rectangular subject candidate area generation unit 72 in FIG. 4 includes a binarization unit 131, a labeling unit 132, a rectangular area coordinate calculation unit 133, and an area information calculation unit 134.

The binarization unit 131 binarizes information corresponding to each pixel of the input image in the subject map supplied from the subject map generation unit 71 through assignment to either 0 or 1 based on a predetermined threshold value, for supply to the labeling unit 132. Hereinafter, the information corresponding to each pixel of the input image in the subject map is hereinafter simply referred to as a pixel.

The labeling unit 132 labels areas adjacent to a pixel having the value 1 (hereinafter, referred to as a connection area) in the binarized subject map from the binarization unit 131 for supplying to the rectangular area coordinate calculation unit 133.

The rectangular area coordinate calculation unit 133 calculates coordinates for a rectangular area including (surrounding) the connection area in the subject map where the connection area is labeled, supplied from the labeling unit 132, and supplies coordinate information indicating the coordinates to the area information calculation unit 134 along with the subject map.

The area information calculation unit 134 calculates area information which is information regarding the rectangular area indicated by the coordinate information on the subject map from the rectangular area coordinate calculation unit 133, and correlates the area information with the coordinate information for supplying to the subject area selection unit 73 (FIG. 1).

Configuration Example of Subject Area Selection Unit

Next, with reference to FIG. 5, a configuration example of the subject area selection unit 73 will be described.

Figure 5:
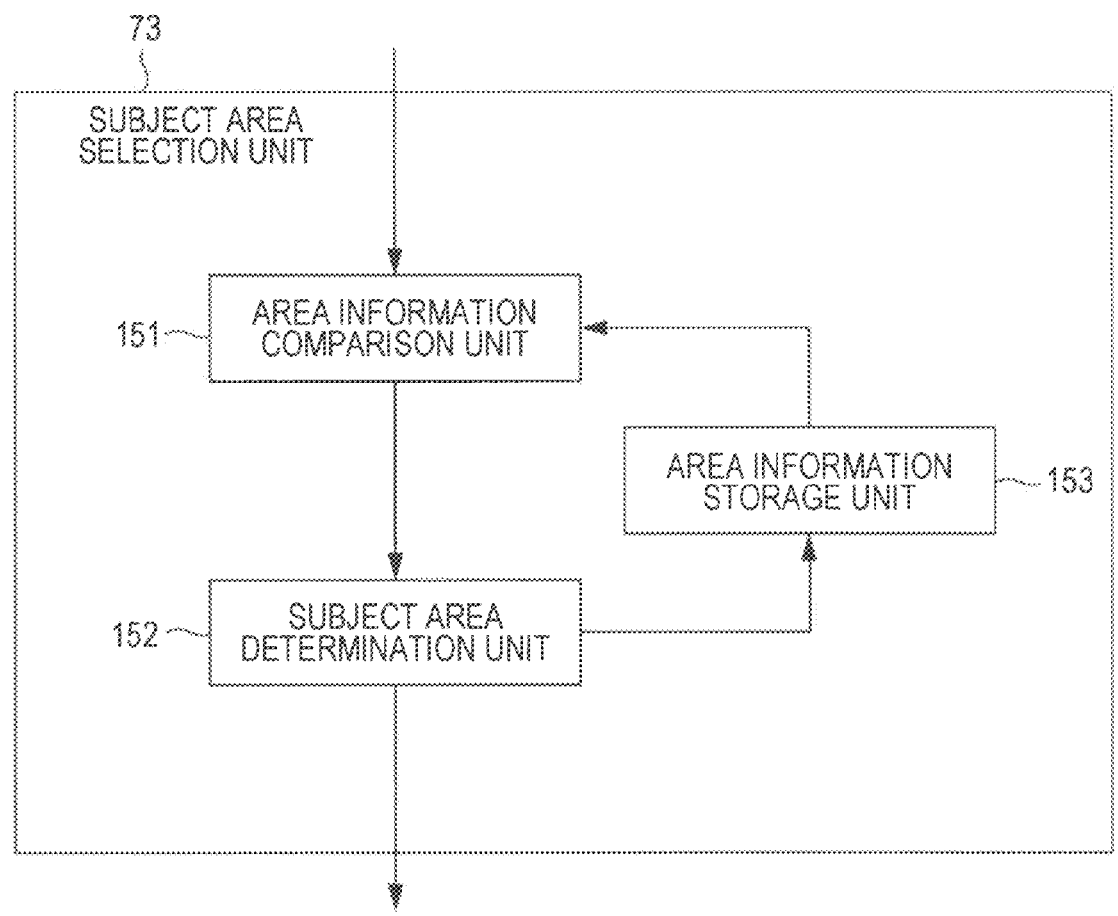
FIG. 5 is a block diagram illustrating a configuration example of a subject area selection unit.

The subject area selection unit 73 in FIG. 5 includes an area information comparison unit 151 and a subject area determination unit 152.

The area information comparison unit 151 compares area information for each of the rectangular areas from the rectangular subject candidate area generation unit 72 with area information for a subject area prior to one frame stored in an area information storage unit 153, and supplies the comparison result to the subject area determination unit 152.

The subject area determination unit 152 designates a rectangular area indicated by the coordinate information correlated with area information closest to the area information for the subject area prior to one frame as a subject area, based on the comparison result from the area information comparison unit 151. The subject area determination unit 152 supplies coordinate information for the determined subject area to the control unit 35 (FIG. 1) and the weight coefficient calculation unit 74 (FIG. 2), and supplies the area information for the subject area to the area information storage unit 153.

The area information storage unit 153 stores the area information for the subject area from the subject area determination unit 152. The area information for the subject area stored in the area information storage unit 153 is read by the area information comparison unit 151 after one frame.

Subject Tracking Process

Hereinafter, a subject tracking process in the image processing device 11 will be described.

Figure 6:
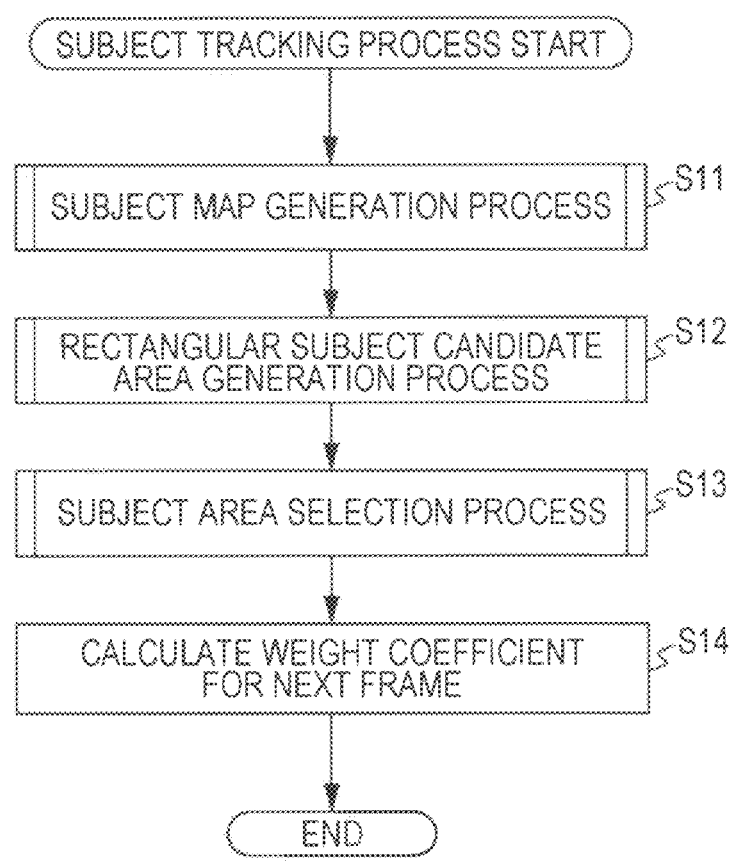
FIG. 6 is a flowchart illustrating a subject tracking process.

FIG. 6 is a flowchart illustrating the subject tracking process in the image processing device 11. The subject tracking process is initialized when a working mode of the image processing device 11 is transited to a subject tracking process mode where the subject tracking process is performed through a user's operation of the user interface 38 which is, for example, a button, and a predetermined area of the subject set as a tracking target in the input image displayed on the display unit 34 is selected by the user.

In step S11, the subject map generation unit 71 of the subject tracking unit 55 performs the subject map generation process to generate a subject map and supplies the generated subject map to the rectangular subject candidate area generation unit 72.

Subject Map Generation Process

Figure 7:
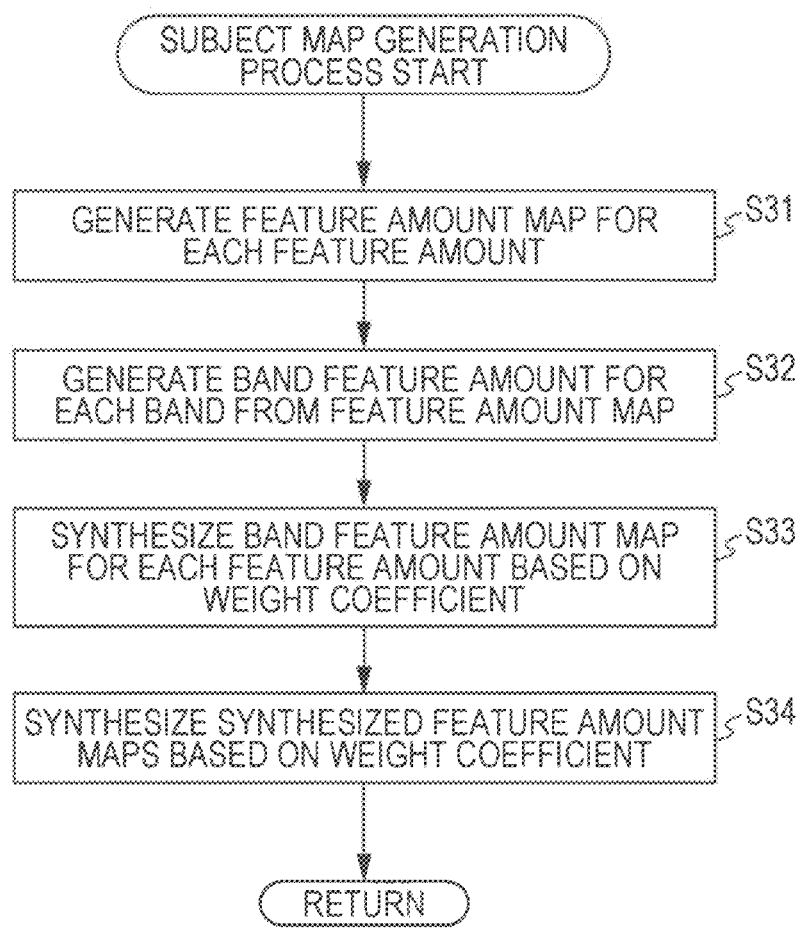
FIG. 7 is a flowchart illustrating a subject map generation process.

Here, a subject map generation process will be described in detail with reference to FIGS. 7 and 8. FIG. 7 is a flowchart illustrating the subject map generation process, and FIG. 8 is a diagram illustrating a detailed example of the subject map generation process.

In step S31 of the flowchart in FIG. 7, the feature amount map generation unit 111 of the subject map generation unit 71 generates a feature amount map for a feature (each feature amount) such as the luminance or the color from a predetermined frame of the input image for supplying to the band feature amount map generation unit 112.

Figure 8:
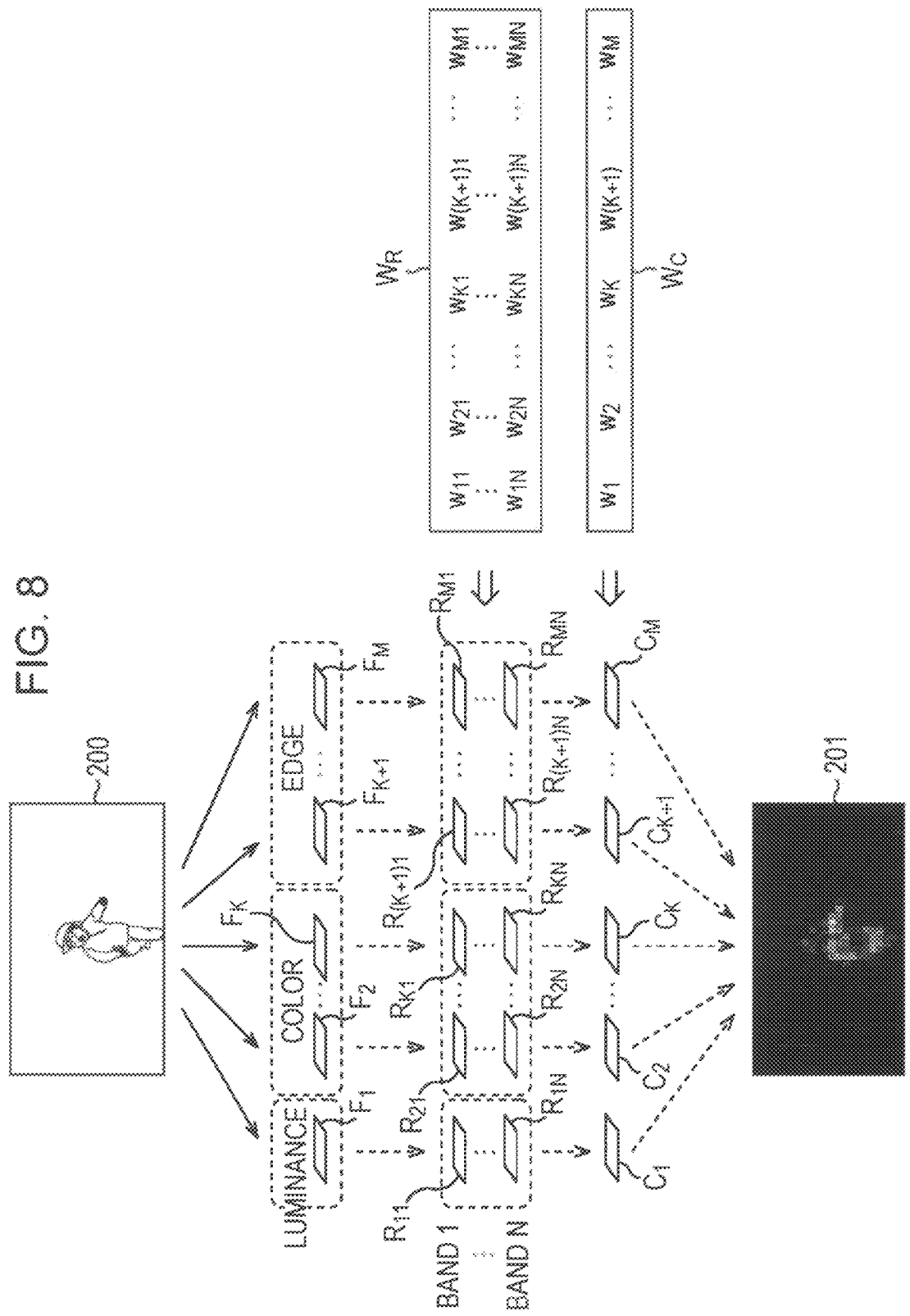
FIG. 8 is a diagram illustrating a detailed example of the subject map generation process.

Specifically, as shown in FIG. 8, from the input image 200, a luminance information map $F_1$ indicating information regarding the luminance, color information maps $F_2$ to $F_K$ indicating information regarding colors, edge information maps $F_{(K+1)}$ to $F_M$ indicating information regarding edges, that is, M types of feature amount maps, are generated.

In the luminance information map $F_1$, a luminance component (luminance signal) Y obtained from each pixel of the input image becomes information corresponding to each pixel of the input image, and in the color information maps $F_2$ to $F_K$, color components (color signals) R, G, and B obtained from each pixel of the input image become information corresponding to each pixel of the input image. Also, in the edge information maps $F_{(K+1)}$ to $F_M$, for example, edge intensities in the directions of 0 degrees, 45 degrees, 90 degrees, and 135 degrees in each of the pixels of the input image become information corresponding to each pixel of the input image.

For the feature amount maps, an average value of the respective components of R, G, and B of the pixel may be information (feature amount) for the luminance information maps $F_1$, and color difference components Cr and Cb or the a* coordinate component and the b* coordinate component in an Lab color space may be information for the color information maps $F_2$ to $F_K$.

Further, edge intensities in directions other than 0 degrees, 45 degrees, 90 degrees, and 135 degrees may be information for edge information maps $F_{(K+1)}$ to $F_M$.

In step S32, the band feature amount map generation unit 112 extracts feature amounts of predetermined band components from the feature amount in each of the feature amount maps for the number of N times, and generates a band feature amount map indicating each of the extracted feature amounts so as to be supplied to the weight coefficient calculation unit 74 and the band feature amount map synthesis unit 113.

Specifically, as shown in FIG. 8, a plurality of pieces of luminance information of predetermined bands 1 to N are extracted from the luminance information in the luminance information maps $F_1$, and band luminance information maps $R_{11}$ to $R_{1N}$ indicating the luminance information of the respective bands are generated. Also, a plurality of pieces of color information of the predetermined bands 1 to N are extracted from the color information in the color information maps $F_2$ to $F_K$, band color information maps $R_{21}$ to $R_{2N}$, . . . , and $R_{K1}$ to $R_{KN}$ indicating the color information of the respective bands are generated. Further, a plurality of pieces of edge information of the predetermined bands 1 to N are extracted from the edge information in the edge information maps $F_{(K+1)}$ to $F_M$, and band edge information maps $R_{(K+1)1}$ to $R_{(K+1)N}$, . . . , and $R_{M1}$ to $R_{MN}$ indicating the edge information of the respective bands are generated. In this way, the band feature amount map generation unit 112 generates (M×N) types of band feature amount maps.

Here, an example of the process in the band feature amount map generation unit 112 will be described.

For example, the band feature amount map generation unit 112 generates a plurality of feature amount maps different in resolutions using the respective feature amount maps, and designates the feature amount maps as pyramid images of the feature amounts. For example, eight hierarchical resolution pyramid images from the levels L1 to L8 are generated, the pyramid image in the level L1 has the highest resolution, and the resolutions of the pyramid images are lowered in an order of the levels L1 to L8.

In this case, the feature amount maps generated by the feature amount map generation unit 111 are regarded as a pyramid image in the level L1. Also, an average value of pixel values of four pixels adjacent to each other in a pyramid images in the level Li (where 1≤i≤7) is regarded as a pixel value of one pixel in a pyramid image in the level L(i+1), corresponding to the pixels. Therefore, the pyramid image in the level L(i+1) becomes an image of a fourth of the pyramid image in the level Li (discarded when not divided).

The band feature amount map generation unit 112 selects two pyramid images different in the hierarchy among the plurality of pyramid images, obtains the difference between the selected pyramid images, and generates N differential images of each feature amount. Further, each hierarchical pyramid image has a different size (the number of pixels), and thereby when the differential images are generated, a smaller pyramid image is up-converted according to a larger pyramid image.

For example, the band feature amount map generation unit 112 obtains differences in the pyramid images between the combinations of the respective hierarchies such as the levels L6 and L3, the levels L7 and L3, the levels L7 and L4, the levels L8 and L4, and the levels L8 and L5, among the pyramid images of the feature amounts in the respective hierarchies. Thereby, it is possible to obtain a total of five differential images of the feature amounts.

Specifically, for example, if a differential image for the combination of the levels L6 and L3 is generated, the pyramid image in the level L6 is up-converted to be suitable for the size of the pyramid image in the level L3. That is to say, a pixel value of one pixel of the pyramid image in the level L6 before being up-converted is regarded as pixel values of several pixels adjacent to each other of the pyramid image in the level L6 after being up-converted, corresponding to the pixel. Further, the difference between a pixel value of a pixel of the pyramid image in the level L6 and a pixel value of a pixel of the pyramid image in the level L3, lying in the same position as the pixel, is obtained, and the difference is regarded as a pixel value of a pixel of the differential image.

By generating the differential images in this way, it is possible to extract feature amounts of predetermined band components from the feature amount maps as if filtering using a bandpass filter is performed for the feature amount maps.

Further, in the above description, widths of the bands extracted from the feature amount maps are determined by the combination of the respective hierarchies of the pyramid images when the differential images are obtained, but this combination is determined arbitrarily.

The extraction of the feature amounts of the predetermined band components is not limited to the method using the differential images, but may be performed by other methods.

Referring to the flowchart in FIG. 7 again, in step S33, the band feature amount map synthesis unit 113 synthesizes the band feature amount maps from the band feature amount map generation unit 112 for each feature amount, based on a weight coefficient group $W_R$ from the weight coefficient calculation unit 74. The band feature amount map synthesis unit 113 supplies the synthesized band feature amount maps (synthesized feature amount maps) to the weight coefficient calculation unit 74 and the synthesized feature amount map synthesis unit 114.

Specifically, as shown in FIG. 8, the band luminance information maps $R_{11}$ to $R_{1N}$ are weighted with the weight coefficients $w_{11}$ to $w_{1N}$ which are weights for the respective band luminance information maps from the weight coefficient calculation unit 74 and are added, thereby obtaining a synthesized feature amount map $C_1$. In addition, the band color information maps $R_{21}$ to $R_{2N}$, . . . , and $R_{K1}$ to $R_{KN}$ are weighted with the weight coefficients $w_{21}$ to $w_{2N}$, . . . , and $w_{K1}$ to $w_{KN}$ which are weights for the respective band color information maps from the weight coefficient calculation unit 74 and added, thereby obtaining synthesized feature amount maps $C_2$ to $C_K$. Further, the band edge information maps $R_{(K+1)1}$ to $R_{(K+1)N}$, . . . , and $R_{M1}$ to $R_{MN}$ are weighted with the weight coefficients $w_{(K+1)1}$ to $w_{(K+1)N}$, . . . , $W_{M1}$ to $W_{MN}$ which are weights for the respective band edge information maps from the weight coefficient calculation unit 74 and added, thereby obtaining synthesized feature amount maps $C_{K+1}$ to $C_M$. In this way, the band feature amount map synthesis unit 113 generates M types of synthesized feature amount maps. In addition, details of the weight coefficient group $W_R$ will be described later, and each of the weight coefficients of the weight coefficient group $W_R$ has a value 0 or 1. However, all the weight coefficients of the weight coefficient group $W_R$ have the value 1 in the first subject map generation process, and thus the band feature amount maps are added without the weighting.

In step S34, the synthesized feature amount map synthesis unit 114 synthesizes the synthesized feature amount maps from the band feature amount map synthesis unit 113 based on a weight coefficient group $W_C$ from the weight coefficient calculation unit 74, thereby generating a subject map, so as to be supplied to the rectangular subject candidate area generation unit 72.

Specifically, as shown in FIG. 8, the synthesized feature amount maps $C_1$ to $C_M$ are linearly combined using the weight coefficients $w_1$ to $w_M$ which are weights for the respective band luminance information maps from the weight coefficient calculation unit 74. A normalized subject map 201 is obtained by multiplying pixel values of the maps obtained as a result of the linear combination by a subject weight which is a weight obtained in advance. Also, details of the weight coefficient group $W_C$ will be described later, and each of the weight coefficients of the weight coefficient group $W_C$ has a value 0 or 1. However, all the weight coefficients of the weight coefficient group $W_C$ have the value 1 in the first subject map generation process, and thus the synthesized feature amount maps are linearly combined without the weighting.

In other words, if a position (pixel) attracting attention on the subject map which will be obtained from here is a position of interest, a pixel value at a position (pixel) which is the same as the position of interest of each synthesized feature amount map is multiplied by the weight coefficient for each synthesized feature amount map, and a sum total of the pixel values multiplied by the weight coefficients are regarded as a pixel value at the position of interest. In addition, the pixel values at the respective positions of the subject map obtained in this way are multiplied by the subject weight obtained regarding the subject map in advance, normalized, and then regarded as a final subject map. For example, the normalization is made such that the pixel values of the respective pixels of the subject map have the values between 0 and 255.

Through the above-described way, the subject map generation unit 71 generates the subject map by generating the band feature amount maps and the synthesized feature amount maps from the feature amount maps.

Referring to the flowchart in FIG. 6 again, in step S12, the rectangular subject candidate area generation unit 72 generates a rectangular subject candidate area, and obtains a rectangular area including areas which become subject candidates in the subject map from the subject map generation unit 71.

Generation of Rectangular Subject Candidate Area

Figure 9:
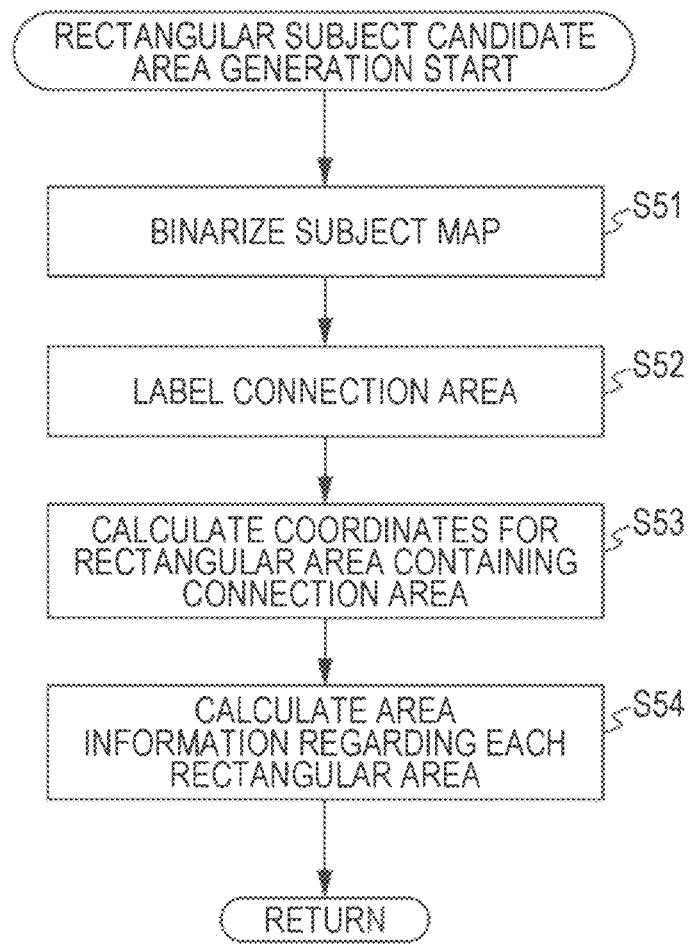
FIG. 9 is a flowchart illustrating a rectangular subject candidate area generation process.

Here, with reference to FIGS. 9 and 10, the generation of a rectangular subject candidate area will be described in detail. FIG. 9 is a flowchart illustrating the generation of a rectangular subject candidate area, and FIG. 10 is a diagram illustrating a detailed example of the generation of a rectangular subject candidate area.

In step S51 of the flowchart in FIG. 9, the binarization unit 131 of the rectangular subject candidate area generation unit 72 binarizes the information in the subject map supplied from the subject map generation unit 71 through the assignment to either 0 or 1 based on a predetermined threshold value, so as to be supplied to the labeling unit 132.

Figure 10:
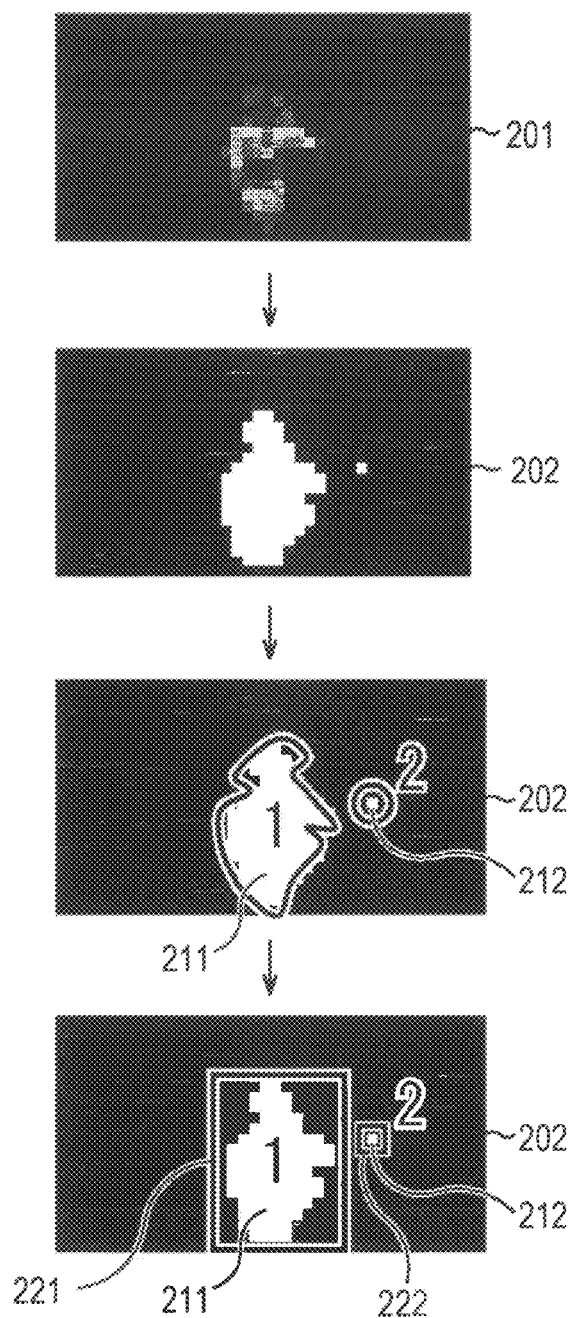
FIG. 10 is a diagram illustrating a detailed example of the rectangular subject candidate area generation process.

More specifically, with respect to the pixel values of the respective pixels of the subject map 201 having the values between 0 and 255, shown in the first part from above in FIG. 10, the binarization unit 131 assigns the pixel values smaller than, for example, a threshold value 127, to 0 and the pixel values larger than 127 to 1. Thereby, it is possible to obtain a binarized map 202 as shown in the second part from above in FIG. 10. In the binarized map 202 shown in FIG. 10, the white portion (pixel) has a pixel value of 1 and the black portion (pixel) has a pixel value of 0. In addition, here, the threshold value is 127, but may be other values.

In step S52, the labeling unit 132 labels the connection area where the pixels having the pixel value 1 are adjacent to each other, which can be obtained by, for example, a morphological operation, in the binarized map 202 (binarized subject map) from the binarization unit 131, for supplying to the rectangular area coordinate calculation unit 133.

More specifically, for example, as shown in the fourth part from above in FIG. 10, in the binarized map 202, the connection area 211 is labeled "1" and the connection area 212 is labeled "2".

In step S53, the rectangular area coordinate calculation unit 133 calculates coordinates for a rectangular area including (surrounding) the connection area in the binarized map 202 from the labeling unit 132, and supplies coordinate information indicating the coordinates to the area information calculation unit 134 along with the binarized map 202.

More specifically, as shown in the third part from above in FIG. 10, in the binarized map 202, a rectangular box (circumscribed box) 221 surrounding the outside of the connection area 211 labeled "1" is detected, and coordinates for the apex of the rectangular box, for example, in the top left and bottom right of the figure, are obtained. In addition, a rectangular box 222 surrounding the outside of the connection area 212 labeled "2" is detected, and coordinates for the apex of the rectangular box, for example, in the top left and bottom right of the figure, are obtained.

In step S54, the area information calculation unit 134 calculates area information regarding the rectangular areas surrounded by the rectangular box on the subject map based on the coordinate information from the rectangular area coordinate calculation unit 133 and the subject map from the subject map generation unit 71.

More specifically, the area information calculation unit 134 calculates sizes of the rectangular boxes and coordinates for central positions as the area information regarding the rectangular areas, based on the coordinate information from the rectangular area coordinate calculation unit 133, indicating the rectangular boxes 221 and 222 in the binarized map 202. The area information calculation unit 134 correlates the calculated area information with the coordinate information from the rectangular area coordinate calculation unit 133 so as to be supplied to the subject area selection unit 73.

In this way, the rectangular subject candidate area generation unit 72 obtains the rectangular boxes surrounding the respective areas which become the subject candidates of interest, and the area information indicating the features of the areas surrounded by the rectangular boxes on the subject map.

Referring to the flowchart in FIG. 6 again, in step S13, the subject area selection unit 73 performs a subject area selection process, and selects a subject area which is a rectangular area containing the subject of interest, from the inside of the rectangular area, based on the area information from the area information calculation unit 134.

Subject Area Selection Process

Figure 11:
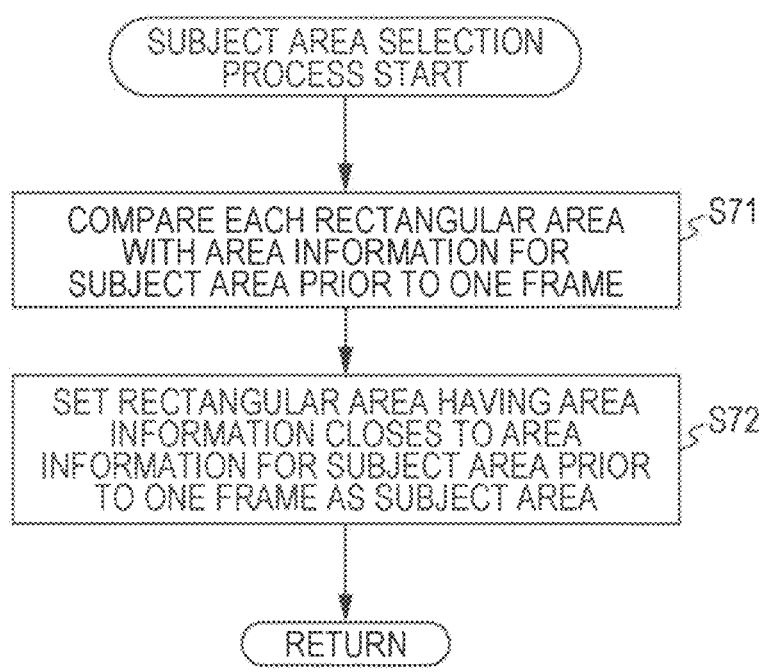
FIG. 11 is a flowchart illustrating a subject area selection process.

Here, with reference to the flowchart in FIG. 11, the subject area selection process will be described in detail.

In step S71, the area information comparison unit 151 compares the area information for the respective rectangular area from the rectangular subject candidate area generation unit 72 with area information for a subject area prior to one frame stored in the area information storage unit 153, and supplies the comparison result to the subject area determination unit 152.

More specifically, for example, the area information comparison unit 151 compares the sizes of the rectangular boxes surrounding the respective rectangular areas on the subject map from the rectangular subject candidate area generation unit 72 with sizes of rectangular boxes (subject boxes) surrounding the subject areas prior to one frame stored in the area information storage unit 153. In addition, for example, the area information comparison unit 151 compares the coordinates for the central positions of the rectangular boxes surrounding the respective rectangular areas on the subject map from the rectangular subject candidate area generation unit 72 with coordinates for the central positions of the rectangular boxes (subject boxes) surrounding the subject areas prior to one frame stored in the area information storage unit 153.

In step S72, the subject area determination unit 152 determines the rectangular area which has the size of the rectangular box (subject box) surrounding the subject area prior to one frame, or a size or a central position of a rectangular box closest to the coordinates for the central position, as a subject area, based on the comparison result from the area information comparison unit 151. The subject area determination unit 152 supplies the coordinate information for the determined subject area to the control unit 35 and the weight coefficient calculation unit 74 and supplies the area information for the subject area (the size or the central position of the subject box) to the area information storage unit 153.

However, since the area information storage unit 153 does not store area information for the subject area prior to one frame in the first subject area selection process, a rectangular area including a predetermined area (hereinafter, referred to as an initially selected area) for a subject selected by a user at the time of starting the subject tracking process is determined as the subject area.

In this way, the subject area selection unit 73 selects the subject area for the subject of interest from the inside of the rectangular area which becomes a subject candidate.

Calculation of Weight Coefficient

Referring to the flowchart in FIG. 6 again, in step S14, the weight coefficient calculation unit 74 calculates the weight coefficient groups $W_R$ and $W_C$ shown in FIG. 8, based on the band feature amount maps and the synthesized feature amount maps from the subject map generation unit 71 and the coordinate information indicating the subject area from the subject area selection unit 73.

Figure 12:
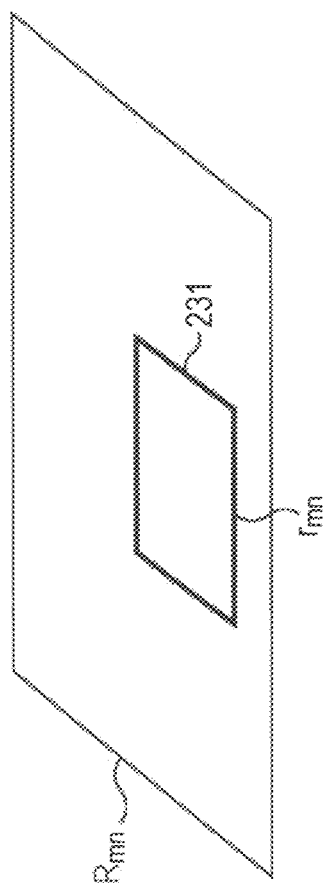
FIG. 12 is a diagram illustrating a subject area feature amount sum of band feature amount maps.
Figure 13:
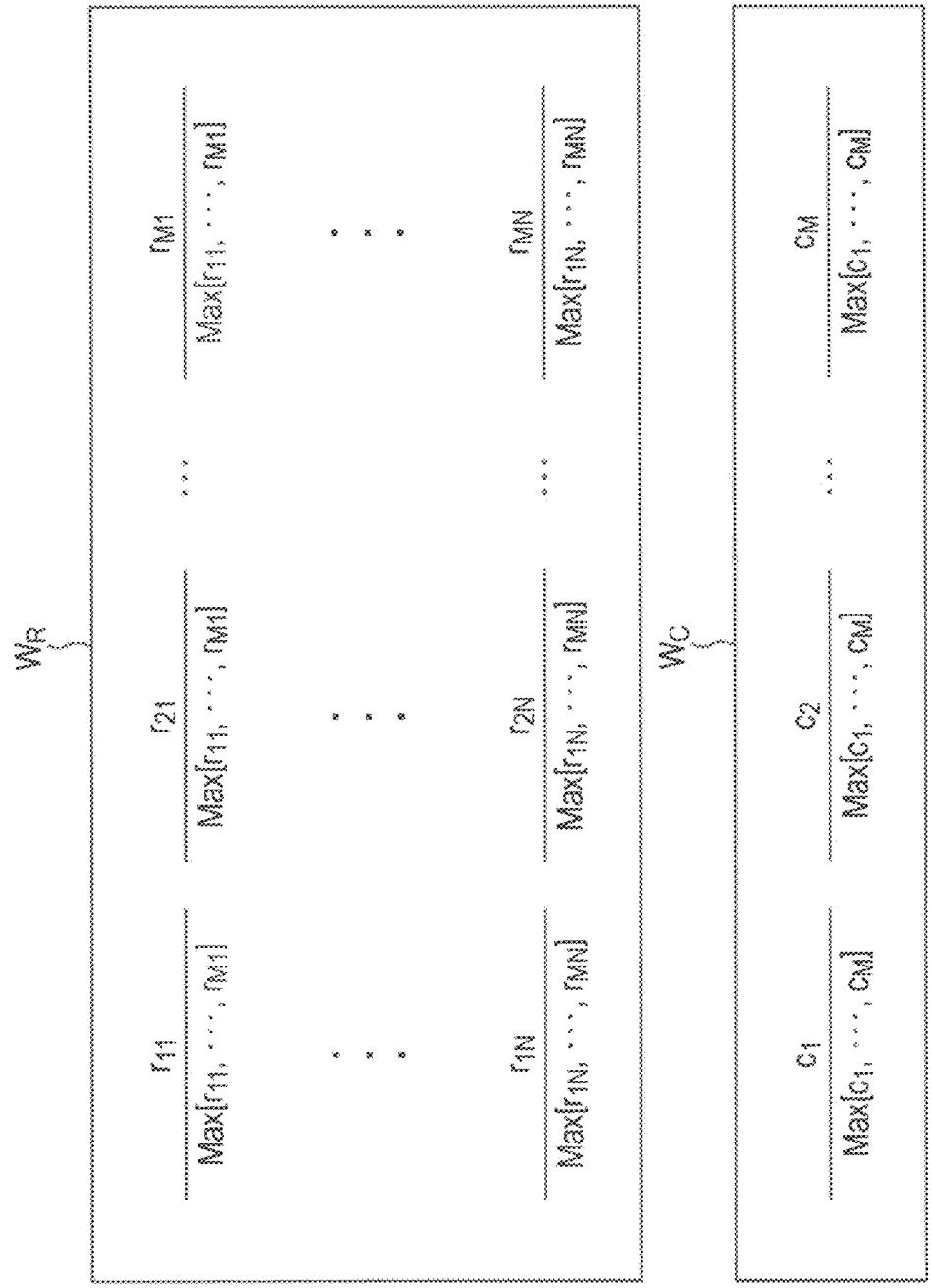
FIG. 13 is a diagram illustrating a weight coefficient.

More specifically, as shown in FIG. 12, if the sum of the feature amounts (information amounts) inside the rectangular area corresponding to the subject box 231 indicating the subject area on the predetermined band feature amount map $R_{mn}$ ($1 \leq m \leq M$, $1 \leq m \leq N$) is assumed as the subject area feature amount sum $r_{mn}$, the weight coefficient group $W_R$ as shown in the upper part of FIG. 13 is calculated.

Each of the coefficients of the weight coefficient group $W_R$ in FIG. 13 corresponds to each of the weight coefficients $w_{11}$ to $w_{MN}$ shown in FIG. 8. In FIG. 13, Max[a, ..., z] indicates the maximum value of the values a to z.

For example, the respective coefficients in the first row from above in the weight coefficient group $W_R$ in FIG. 13 indicate the weight coefficients $w_{11}$ to $w_{M1}$ regarding the band feature amount maps $R_{11}$ to $R_{M1}$ for each feature amount, which belong to "the band 1", shown in FIG. 8. As shown in FIG. 13, the weight coefficients $w_{11}$ to $w_{M1}$ have, as the denominator, the maximum value of the subject area feature amount sum $r_{11}$ to $r_{M1}$ regarding the respective band feature amount maps $R_{11}$ to $R_{M1}$, and, as the numerator, the coefficients of the subject area feature amount sum $r_{11}$ to $r_{M1}$ regarding the respective band feature amount maps $R_{11}$ to $R_{M1}$, in which a value of 0 or 1 is employed.

In the same manner, the respective coefficients in the N-th row from above in the weight coefficient group $W_R$ in FIG. 13 indicate the weight coefficients $w_{1N}$ to $w_{MN}$ regarding the band feature amount maps $R_{1N}$ to $R_{MN}$ for each feature amount, which belong to "the band N", shown in FIG. 8. As shown in FIG. 13, the weight coefficients $w_{1N}$ to $w_{MN}$ have, as the denominator, the maximum value of the subject area feature amount sum $r_{1N}$ to $r_{MN}$ regarding the respective band feature amount maps $R_{1N}$ to $R_{MN}$, and, as the numerator, the coefficients of the subject area feature amount sum $r_{1N}$ to $r_{MN}$ regarding the respective band feature amount maps $R_{1N}$ to $R_{MN}$, in which a value of 0 or 1 is employed.

In other words, with the weight coefficients $w_{1n}$ to $w_{Mn}$, a band feature amount map of feature amounts which maximizes the subject area feature amount sum among the band feature amount maps $R_{1n}$ to $R_{Mn}$ for each feature amount which belong to "the band n" is weighted to generate the maximum value 1, and the other band feature amount maps are weighted according to the subject area feature amount sum.

In addition, if the sum of the feature amounts (information amounts) inside the rectangular area corresponding to the rectangular box 221 indicating the subject area on the predetermined synthesized feature amount map $C_m$ ($1 \leq m \leq M$) is assumed as subject area feature amount sum $c_m$, the weight coefficient group $W_C$ as shown in the lower part of FIG. 13 is calculated.

The respective coefficients in the weight coefficient group $W_C$ in FIG. 13 correspond to the weight coefficients $w_1$ to $w_M$ shown in FIG. 8.

In other words, each of the coefficients of the weight coefficient group $W_C$ in FIG. 13 corresponds to each of the weight coefficients $w_1$ to $w_M$ regarding the synthesized feature amount maps $C_1$ to $C_M$ for each feature amount shown in FIG. 8. As shown in FIG. 13, the weight coefficients $w_1$ to $w_M$ have, as the denominator, the maximum value of the subject area feature amount sum $c_1$ to $c_M$ regarding the respective synthesized feature amount maps $C_1$ to $C_M$, and, as the numerator, the coefficients of the subject area feature amount sum $c_1$ to $c_M$ regarding the respective synthesized feature amount maps $C_1$ to $C_M$, in which a value of 0 or 1 is employed.

In other words, with the weight coefficients $w_1$ to $w_M$, a synthesized feature amount map of feature amounts which maximizes the subject area feature amount sum among the synthesized feature amount maps $C_1$ to $C_M$ for each feature amount is weighted to generate the maximum value 1, and the other band feature amount maps are weighted according to the subject area feature amount sum.

The weight coefficient calculation unit 74 supplies the calculated weight coefficient group $W_R$ to the band feature amount map synthesis unit 113 of the subject map generation unit 71 and supplies the weight coefficient group $W_C$ to the synthesized feature amount map synthesis unit 114 of the subject map generation unit 71. In the flowchart in FIG. 6, after step S14, the subject tracking process is performed for a next frame, and this process is repeated for each frame.

According to the above-described process, weight coefficients for feature amount maps for each feature amount regarding a next frame is determined according to a relative magnitude of the feature amount of an area corresponding to the subject area selected in a certain frame of the input image in the feature amount maps for each feature amount regarding the frame. Therefore, even in a case where the feature amount varies between frames, the subject map is generated by maximally weighting the feature amount map of the feature amount which represent the subject best among a plurality of feature amounts, and thus it is possible to more stably track the subject even in an environment where the state of the subject tends to vary.

Also, the subject area is determined so as to include the entire subject, and thus it is possible to more stably track the subject even in an environment where the state of a portion of the subject area tends to vary.

Particularly, in the subject tracking method in the related art, in a case where some coordinates in the subject area (or a partial area including the coordinates) are identified, the entire subject is not tracked, and a detection box such as AF (auto focus), AE (auto exposure) or ACC (auto color control) is not properly set. In addition, in a case where an equal feature amount area which has the same feature amount in the subject area is identified, accuracy in setting the detection box is higher than in the above case, but the equal feature amount area corresponds to a very small portion of the subject area for the most part, and thus sufficient detection accuracy may not be obtained.

On the other hand, according to the above-described subject tracking process, the subject area including the entire subject can be identified, and thus it is possible to increase detection accuracy, and moreover, it is possible to apply the tracking result to various applications.

In addition, in the subject tracking method in the related art, for example, the entire image of a human being is registered in a database by learning or the like and then the human being is detected and tracked, but subjects other than human beings, which are not registered in the dictionary, may not be tracked. Further, since an amount of information (image) registered in the dictionary is massive, a device scale becomes very large.

On the other hand, according to the above-described subject tracking process, since an arbitrary subject can be detected and tracked, it is not necessary to register a massive amount of information in the dictionary, and thus the device scale can be made compact.

As described above, the feature amounts use the luminance component, the color component, and the edge direction, but are not limited thereto, and, for example, they may further include motion information and the like.

Also, the usable feature amounts are preferably in a complementary relationship such as, for example, the luminance component and the color component, which may be appropriately selected.

As described above, although M×(N+1) types of weight coefficients corresponding to M×(N+1) types of feature amount maps are calculated, only weight coefficients corresponding to a portion of the feature amount maps are appropriately calculated, and thus it is possible to suppress an amount operated by the image processing device 11. For example, only the weight coefficients $w_1$ to $w_M$ corresponding to M types of feature amount maps of the synthesized feature amount maps $C_1$ to $C_M$ may be calculated.

In addition, as described above, although the area information calculation unit 134 calculates the sizes of the rectangular boxes and the coordinates for the central position as the area information for the rectangular areas, it may calculate an integral value or a peak value (maximum value) of the pixel values in the rectangular area. In this case, in the subject area selection process (FIG. 11), a rectangular area having an integral value or a peak value of pixel values in an area closest to an integral value or a peak value of the pixel value of a subject area prior to one frame is regarded as a subject area.

Meanwhile, if the image processing device 11 is constituted by a digital still camera which captures still images, a user confirms moving images (finder images) displayed on the display unit 34 and performs a shutter operation at a desired timing, thereby capturing still images.

The image processing device 11 configured in this way can perform a trim process where a plurality of trim images containing the tracked subject are generated from the still image captured through the user's shutter operation (hereinafter, referred to as a captured image), as an example of applications to which the tracking result of the above-described subject tracking process is applied.

Functional Configuration Example of Control Unit

Figure 14:
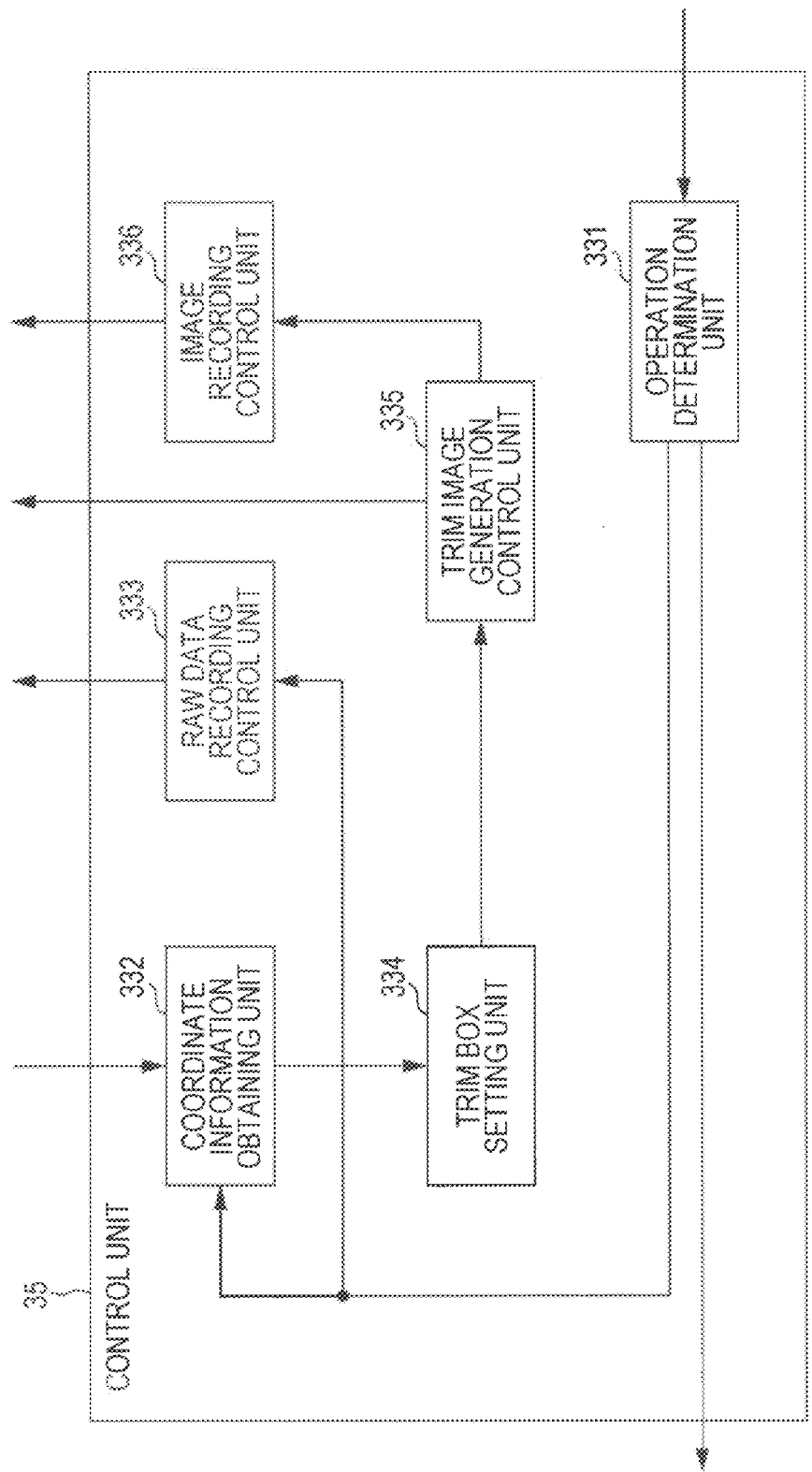
FIG. 14 is a block diagram illustrating a functional configuration example of a control unit.

Here, with reference to FIG. 14, there will be a description of a functional configuration example of the control unit 35 which performs a trim process where a plurality of trim images containing the subject tracked through the subject tracking process are generated.

The control unit 35 in FIG. 14 includes an operation determination unit 331, a coordinate information obtaining unit 332, a raw data recording control unit 333, a trim box setting unit 334, a trim image generation control unit 335, and an image recording control unit 336.

The operation determination unit 331 determines whether or not the shutter button which is the user interface 38 is operated based on a control signal from the user interface control unit 37. The operation determination unit 331 supplies information for instructing image capture to the imager 32 if the shutter button is operated. Thereby, the digital signal processing unit 33 is supplied with raw data corresponding to a captured image. The operation determination unit 331 supplies information indicating that the shutter button is operated, to the coordinate information obtaining unit 332 and the raw data recording control unit 333.

The coordinate information obtaining unit 332 obtains coordinate information for the subject area regarding a frame corresponding to the captured image, which is supplied from the subject tracking unit 55, based on the information from the operation determination unit 331, and supplies the obtained coordinate information to the trim box setting unit 334.

The raw data recording control unit 333 controls the memory controller 58 and makes the raw data regarding the frame corresponding to the captured image recorded in the DRAM 40, based on the information from the operation determination unit 331.

The trim box setting unit 334 sets a plurality of trim boxes containing the subject area indicated by the coordinate information from the coordinate information obtaining unit 332 in the frame corresponding to the captured image based on the coordinate information from the coordinate information obtaining unit 332, and supplies information indicating the trim boxes to the trim image generation control unit 335.

The trim image generation control unit 335 controls the respective parts of the digital signal processing unit 33, makes the digital signal processing unit 33 read the raw data recorded in the DRAM 40, and generates a plurality of trim images based on the information indicating the trim boxes from the trim box setting unit 334. The trim image generation control unit 335 supplies information indicating that the plurality of trim images are generated, to the image recording control unit 336.

The image recording control unit 336 controls the recording medium interface 57 and makes the trim images generated by the digital signal processing unit 33 recorded in the recording medium 39 based on the information from the trim image generation control unit 335.

Trim Process

Next, a trim process in the image processing device 11 will be described with reference to FIG. 15.

In step S311, the subject tracking unit 55 performs the subject tracking process described in the flowchart in FIG. 6, and supplies the coordinate information for the subject area to the control unit 35.

In step S312, the operation determination unit 331 determines whether or not a shutter operation by a user is performed based on a control signal from the user interface control unit 37.

In step S312, the processes in steps S311 and 312 are repeated until the shutter operation is performed by the user, and, if it is determined that the shutter operation is performed, the operation determination unit 331 supplies information for instructing image capture to the imager 32. The operation determination unit 331 supplies information indicating that the shutter operation is performed, to the coordinate information obtaining unit 332 and the raw data recording control unit 333, and the flow goes to step S313.

In step S313, if supplied with the information indicating that the shutter operation is performed by the user from the operation determination unit 331, the coordinate information obtaining unit 332 obtains the coordinate information for the subject area from the subject tracking unit 55, regarding the frame corresponding to the captured image (hereinafter, also referred to as a shutter frame), and supplies the obtained coordinate information to the trim box setting unit 334.

In step S314, if supplied with the information indicating that the shutter operation is performed by the user, the raw data recording control unit 333 controls the memory controller 58 and makes the raw data regarding the shutter frame recorded in the DRAM 40.

In step S315, the trim box setting unit 334 sets a plurality of trim boxes containing the subject area indicated by the coordinate information from the coordinate information obtaining unit 332 in the shutter frame based on the coordinate information from the coordinate information obtaining unit 332.

Next, with reference to FIGS. 16 to 18, the trim box setting in the trim box setting unit 334 will be described.

Figure 16:
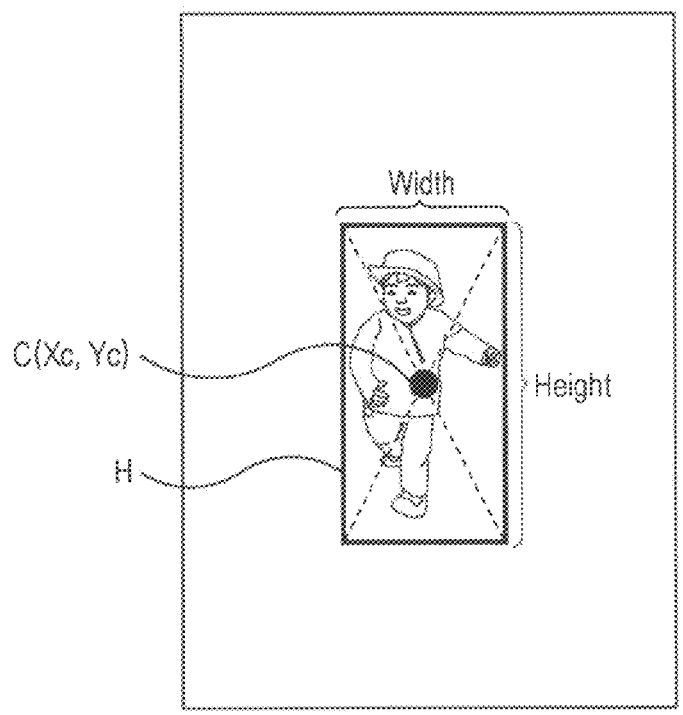
FIG. 16 is a diagram illustrating a trim box setting.

FIG. 16 shows an example of a subject box H indicating the subject area in the captured image. The subject box H is given based on the coordinate information (for example, coordinates for the apexes in the top left and bottom right of the rectangular area) from the coordinate information obtaining unit 332. Further, in FIG. 16, the width and the height of the subject box H are marked with Width and Height, and coordinates for the central position of the subject box H is indicated by C(Xc, Yc).

Figure 17:
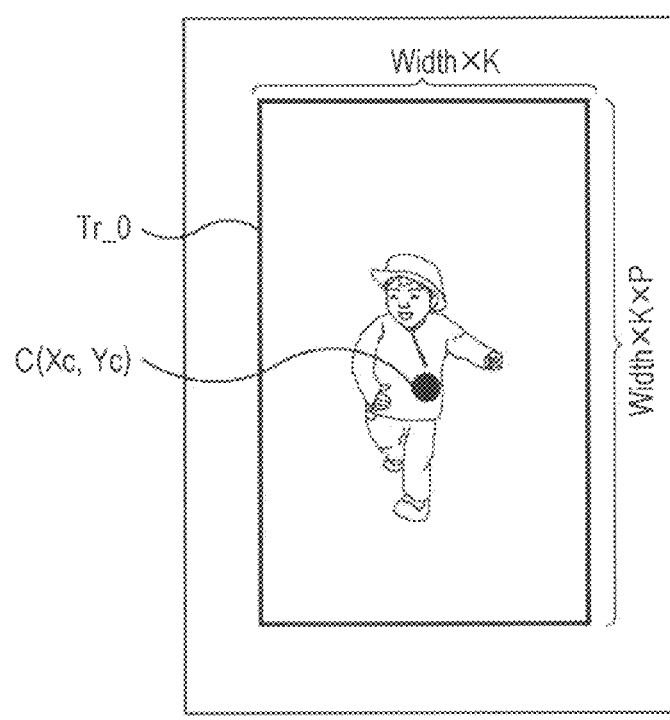
FIG. 17 is a diagram illustrating a trim box setting.

If the coordinate information for the subject area as shown in FIG. 16 is supplied, the trim box setting unit 334 sets, for example, a trim box Tr_0 shown in FIG. 17.

In FIG. 17, the trim box Tr_0 is set as a rectangular area with the width (Width×K) and the height (Width×K×P). Here, the value K is a constant value determined in advance, and the value P denotes an aspect ratio of the captured image. In addition, the coordinates for the central position of the trim box Tr_0 is given by C(Xc, Yc) in the same manner as the subject box H in FIG. 16. In other words, the trim box Tr_0 shown in FIG. 17 is a trim box which contains the subject box H at the center thereof.

The trim box setting unit 334 sets trim boxes such that the trim box Tr_0 is slightly moved, for example, in the eight directions, that is, in the top, bottom, left, right, top left, top right, bottom left, and bottom right directions in the captured image with respect to the trim box Tr_0 shown in FIG. 17 in a range of not protruding out of the captured image.

Figure 18:
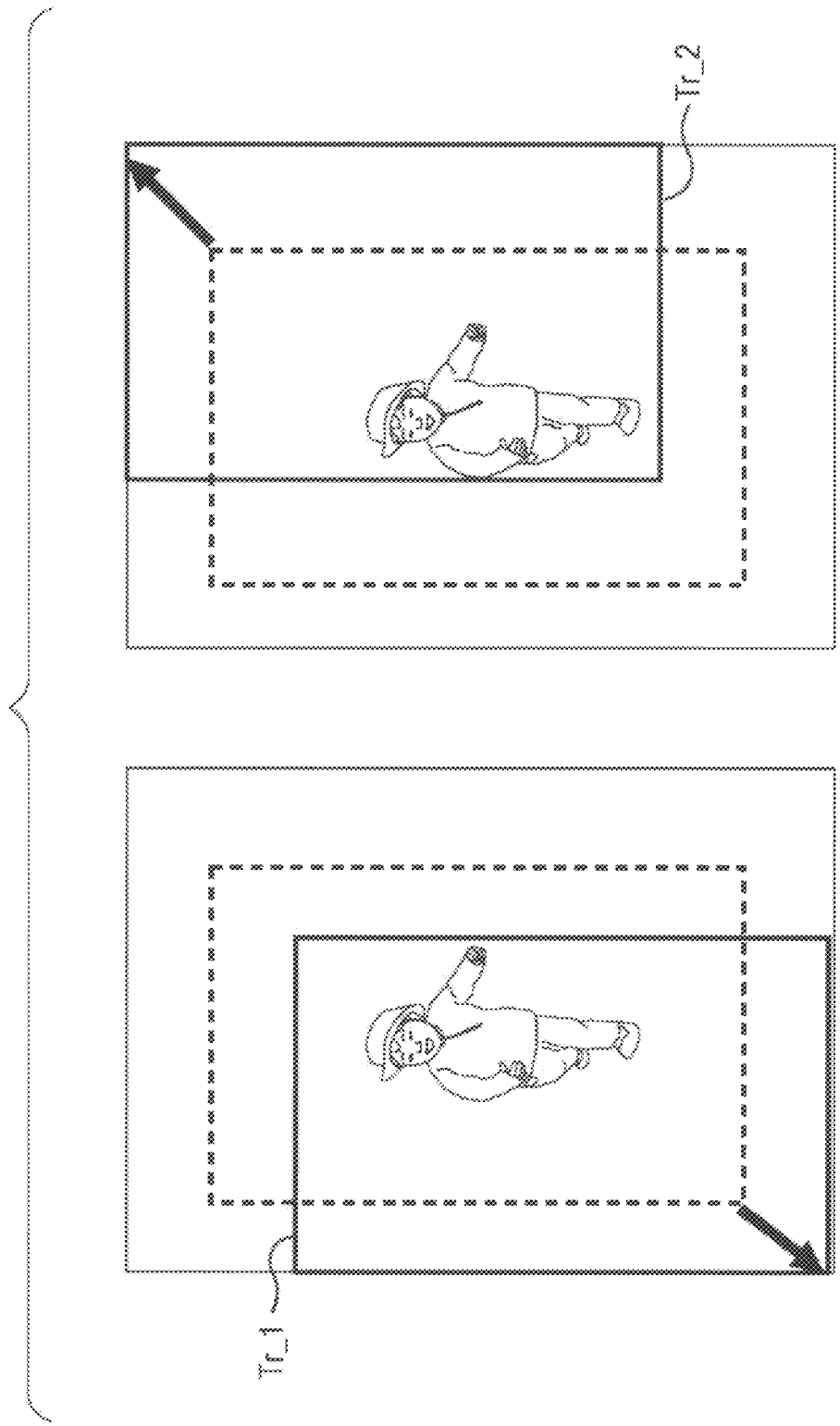
FIG. 18 is a diagram illustrating a trim box setting.

Specifically, the trim box setting unit 334, as shown in FIG. 18, sets a trim box Tr_1 such that the trim box Tr_0 (the box marked with the broken lines in the figure) is slightly moved in the bottom left direction in a range of not protruding out of the captured image, as one of the plural trim boxes. In addition, the trim box setting unit 334, as shown in FIG. 18, sets a trim box Tr_2 such that the trim box Tr_0 (the box marked with the broken lines in the figure) is slightly moved in the top right direction in a range of not protruding out of the captured image, as one of the plural trim boxes.

In this way, the plural trim boxes containing the subject area in the captured image are set. The trim box setting unit 334 supplies information indicating the set plurality of trim boxes to the trim image generation control unit 335.

Referring to the flowchart in FIG. 15 again, in step S316, if the information indicating the plurality of trim boxes is supplied from the trim box setting unit 334, the trim image generation control unit 335 controls the respective parts of the digital signal processing unit 33. In other words, the trim image generation control unit 335 makes the digital signal processing unit 33 read the raw data stored in the DRAM 40 and thus generates a plurality of trim images based on the information indicating the trim boxes from the trim box setting unit 334. In addition, the trim image generation control unit 335 makes a captured image which is not trimmed (hereinafter, appropriately referred to as an original image) generated. Further, the trim image generation control unit 335 supplies information indicating the generation of the plurality of trim images to the image recording control unit 336.

In step S317, if the information indicating the generation of the plurality of trim images is supplied from the trim image generation control unit 335, the image recording control unit 336 controls the recording medium interface 57 and makes the original image and the plural trim images generated by the digital signal processing unit 33 recorded in the recording medium 39. At this time, the image recording control unit 336 makes the original image and the trim images recorded in different folders of the recording medium 39.

According to the above-described process, the plurality of trim boxes containing the subject area are set in the image captured through the user's shutter operation, and then the plurality of trim images are generated. At this time, it is possible to provide suitable trim images without inconvenient operations after the photographing or advanced techniques during the photographing simply through the user's shutter operation.

Since the image originally captured through the user's shutter operation (original image) and the trim images are recorded in different folders of the recording medium 39, images containing the same subject with different image angles are not mixed, and thus it is possible to prevent the user from being confused.

In the above description, although the configuration where the plurality of trim box containing the subject area is set has been described, a position of the subject in the trim images, that is, a composition of the trim images, is not greatly considered.

Therefore, hereinafter, a configuration where trim boxes taking into consideration of the composition of the trim images are set will be described.

Another Functional Configuration Example of Control Unit

Figure 19:
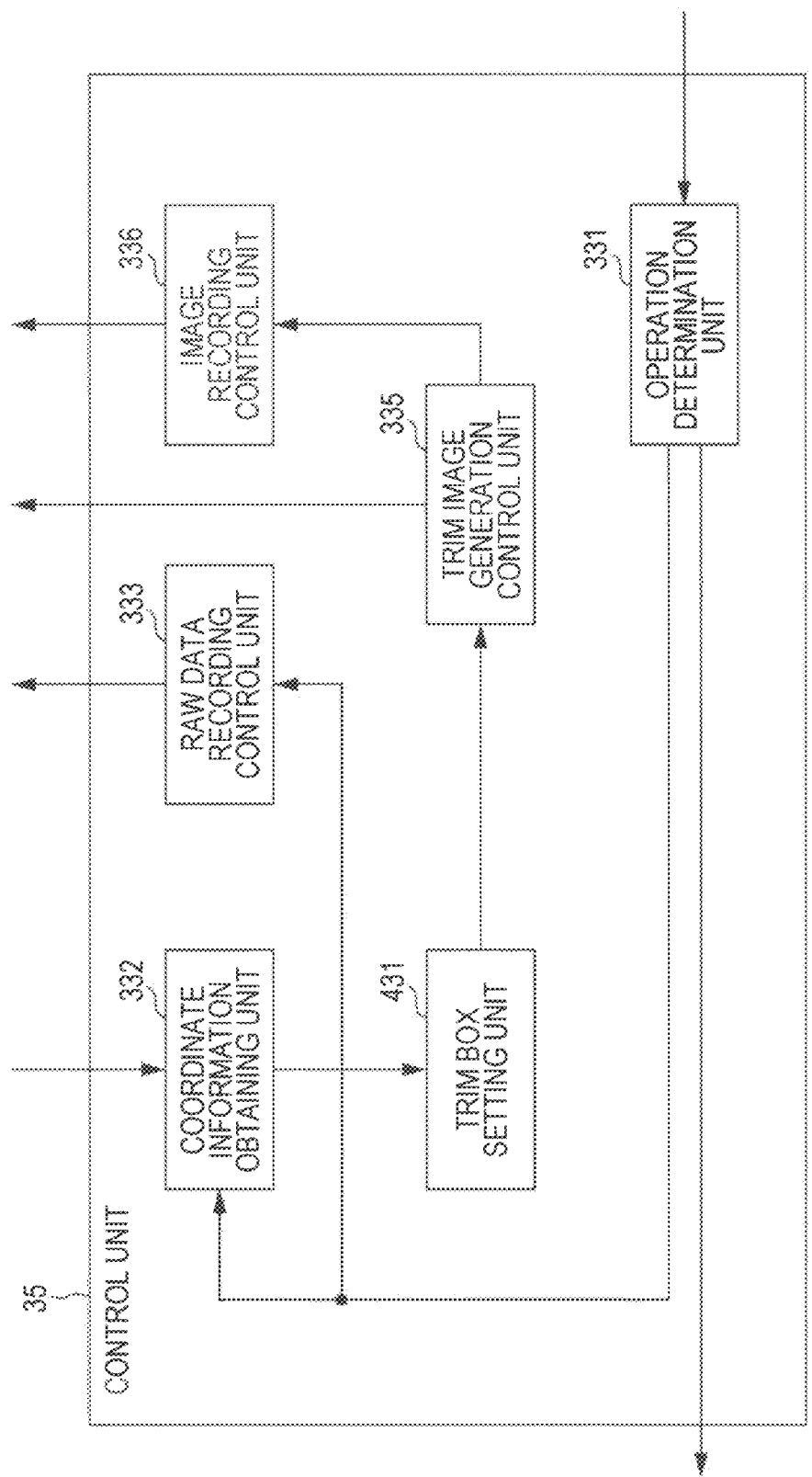
FIG. 19 is a block diagram illustrating another functional configuration example of the control unit.

FIG. 19 shows a functional configuration example of the control unit 35 which sets trim boxes taking into consideration of the composition of the trim images.

In the control unit 35 in FIG. 19, like names and reference numerals are added to the constituent elements having the same functions as those in the control unit 35 in FIG. 14, and the description thereof will be appropriately omitted.

That is to say, the control unit 35 in FIG. 19 is different from the control unit 35 in FIG. 14 in that a trim box setting unit 431 is provided instead of the trim box setting unit 334.

The trim box setting unit 431 sets a plurality of trim boxes such that a position of the subject area indicated by the coordinate information from the coordinate information obtaining unit 332 comes to a predetermined position in a composition set in advance in the shutter frame, based on the coordinate information from the coordinate information obtaining unit 332, and supplies information indicating the trim boxes to the trim image generation control unit 335.

Trim Process

Next, with reference to the flowchart in FIG. 20, a trim process in the image processing device 11 having the control unit 35 in FIG. 19 will be described.

Figure 15:
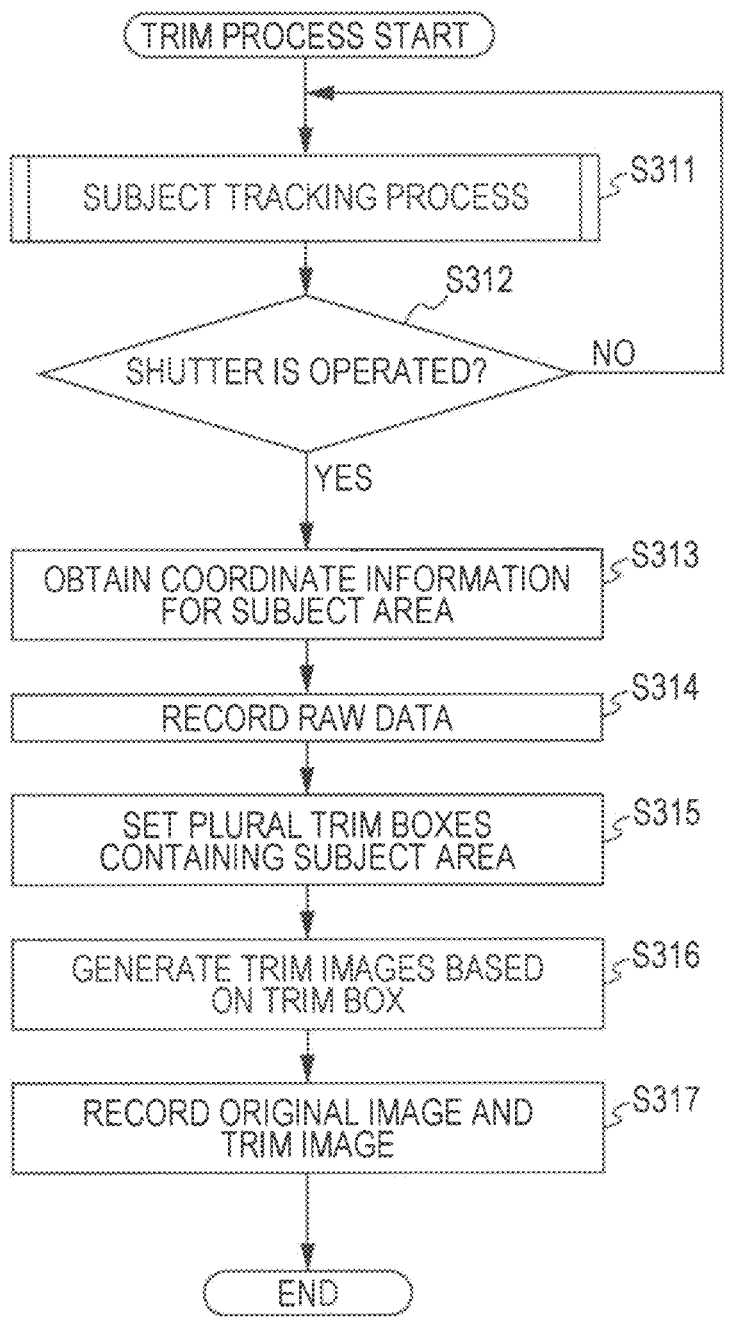
FIG. 15 is a flowchart illustrating a trim process.
Figure 20:
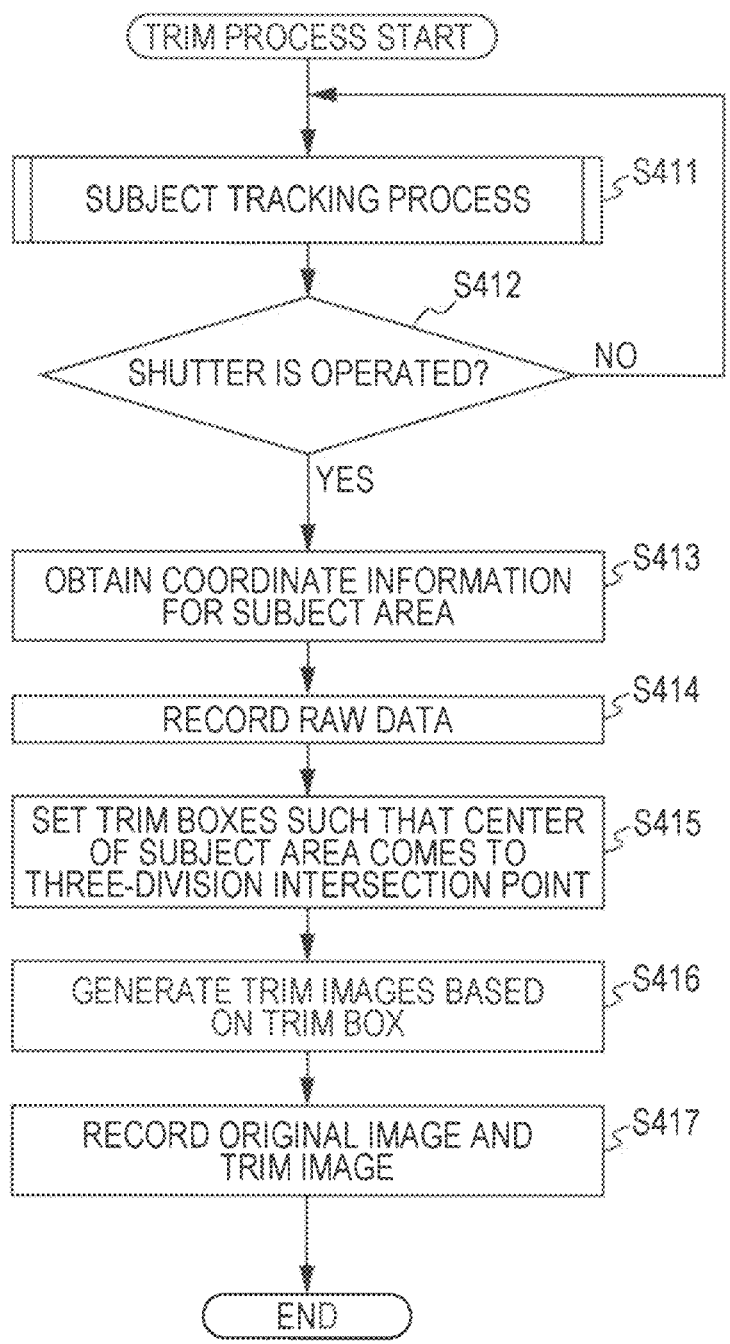
FIG. 20 is a flowchart illustrating a trim process.

The processes in steps S411 to S414 and S416 to S417 in the flowchart in FIG. 20 are fundamentally the same as those in steps S311 to S314 and S316 to S317 in the flowchart in FIG. 15, and thus descriptions thereof will be omitted.

That is to say, in step S415, the trim box setting unit 431 sets a plurality of trim boxes such that the position of the subject area indicated by the coordinate information from the coordinate information obtaining unit 332 comes to a predetermined position in a composition set in advance in the shutter frame, based on the coordinate information from the coordinate information obtaining unit 332.

For example, the trim box setting unit 431 sets a plurality of trim boxes such that the central position of the subject area indicated by the coordinate information from the coordinate information obtaining unit 332 comes to an intersection point of three-divisional lines (three-divisional intersection point) which divides a three-divisional composition into three in the horizontal and vertical directions in the three-divisional composition, in the shutter frame.

Figure 21:
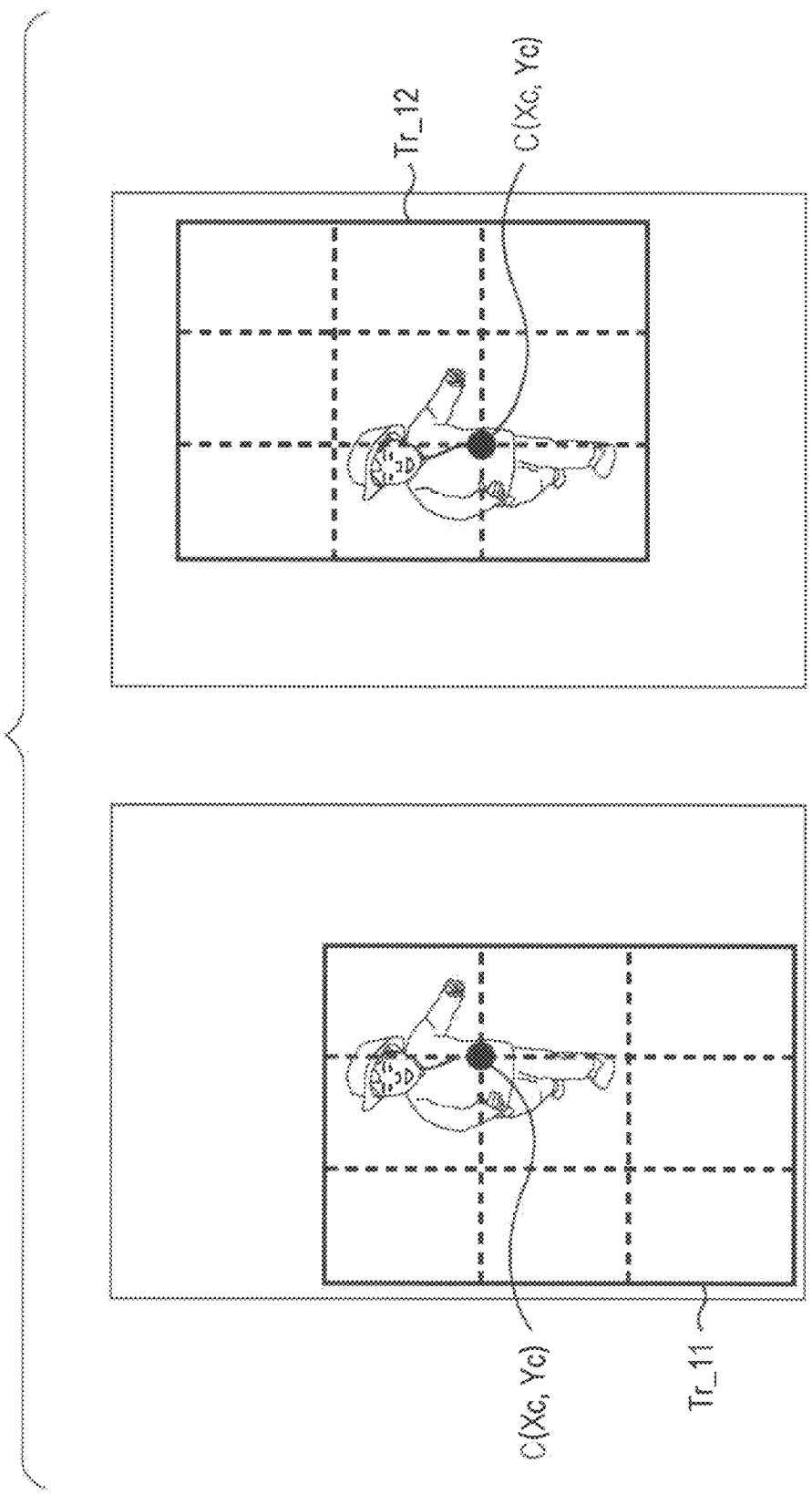
FIG. 21 is a diagram illustrating a trim box setting.

Specifically, the trim box setting unit 431, as shown in FIG. 21, sets a trim box Tr_11 having the three-divisional lines with the same size as the trim box Tr_0 (FIG. 17) in the captured image such that the three-divisional intersection point in the top right thereof corresponds with the coordinates C(Xc, Yc) for the central position of the subject area. In addition, the trim box setting unit 431, as shown in FIG. 21, sets a trim box Tr_12 having the three-divisional lines with the same size as the trim box Tr_0 in the captured image such that the three-divisional intersection point in the bottom left thereof corresponds with the coordinates C(Xc, Yc) for the central position of the subject area.

In the same manner, the trim box setting unit 431 sets trim boxes having the three-divisional lines such that the three-divisional intersection points in the top left and bottom right thereof correspond with the coordinates C(Xc, Yc) for the central position of the subject area.

In other words, in this case, four trim boxes are set.

However, in a case where trim boxes protrude out of the captured image due to the central position of the subject area, the trim boxes are not set.

According to the above-described process, in the image captured through the user's shutter operation, the plural trim boxes are set such that the central position of the subject area comes to the three-divisional intersection points of the trim images and then the plural trim images are generated. At this time, it is possible to provide trim images in which the arrangement of the subject is suitable without inconvenient operations after the photographing or advanced techniques during the photographing simply through the user's shutter operation.

In addition, in the above description, although the trim boxes are set such that the central position of the subject area comes to the three-divisional intersection points in the three-divisional composition, the trim boxes may be set such that the central position is not limited to the three-divisional intersection points in the three-divisional composition but comes to predetermined positions in other compositions such as the Japanese flag composition or a contrast composition.

In the above description, although the configuration where the trim boxes are set in the image captured when the shutter operation is performed by the user has been described, a configuration where the trim boxes are set in an image captured when a shutter operation (image capture) is automatically performed according to a position of a subject will be described hereinafter.

Another Functional Configuration Example of Control Unit

Figure 22:
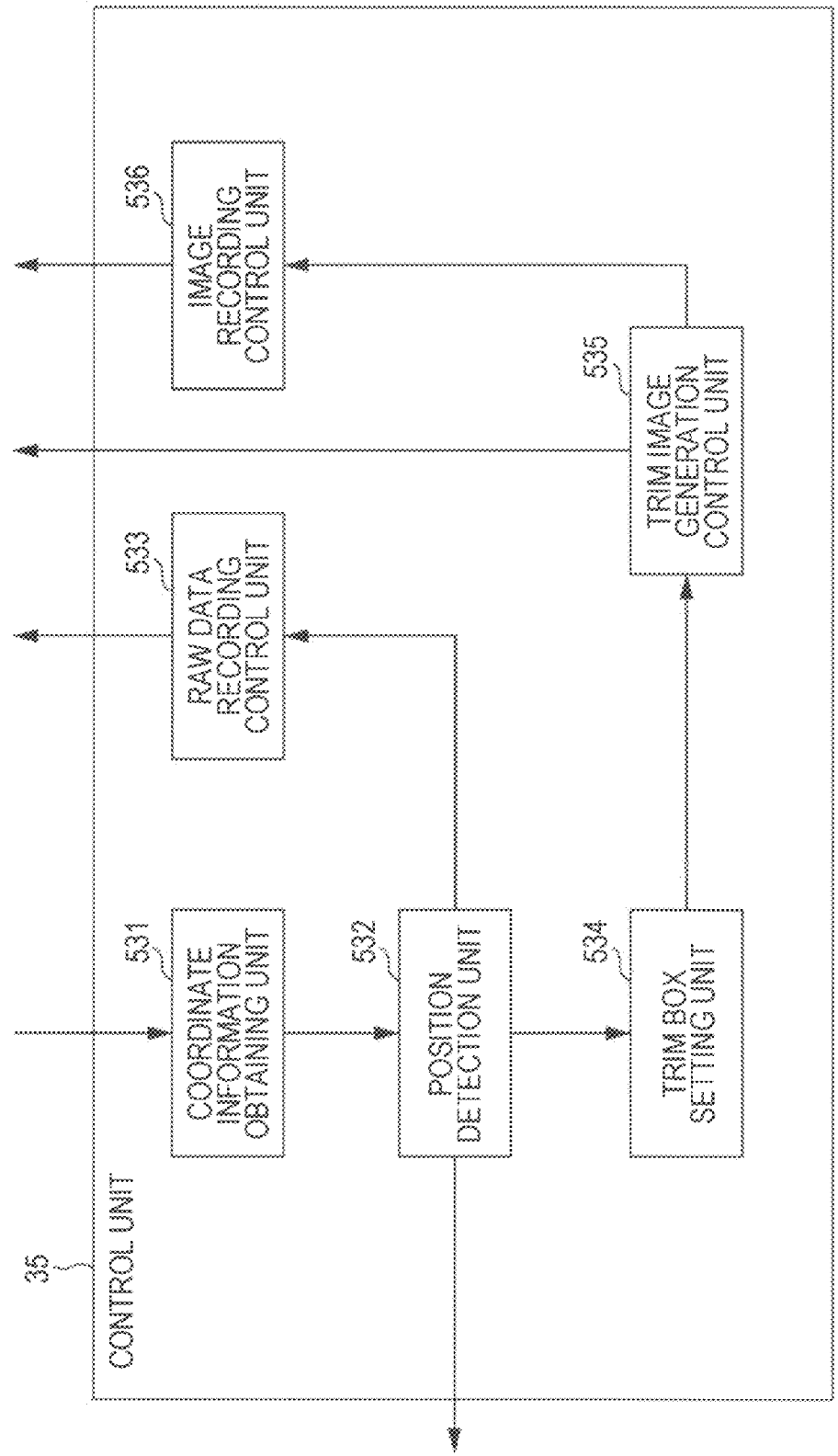
FIG. 22 is a block diagram illustrating another functional configuration example of the control unit.

FIG. 22 shows a functional configuration example of the control unit 35 which sets trim boxes in an image captured when a shutter operation is performed automatically according to the position of a subject.

In the control unit 35 in FIG. 22, a trim image generation control unit 535 and an image recording control unit 536 fundamentally have the same functions as the trim image generation control unit 335 and the image recording control unit 336 in the control unit 35 in FIG. 14, and thus the description thereof will be omitted.

A coordinate information obtaining unit 531 obtains coordinate information for a subject area supplied for each frame of an input image from the subject tracking unit 55 so as to be supplied to a position detection unit 532.

The position detection unit 532 detects the position of a subject in a certain frame of the input image based on the coordinate information for the subject area from the coordinate information obtaining unit 531, and supplies an instruction for image capture to the imager 32 according to the position. Thereby, the digital signal processing unit 33 is supplied with raw data corresponding to the captured image. The position detection unit 532 supplies information corresponding to the position to a raw data recording control unit 533 and supplies the coordinate information for the subject area from the coordinate information obtaining unit 531 to the trim box setting unit 534.

The raw data recording control unit 533 controls the memory controller 58 depending on the information from the position detection unit 532, and makes raw data regarding a frame corresponding to the captured image recorded in the DRAM 40.

The trim box setting unit 534 sets the number of trim boxes according to the size of the subject area indicated by the coordinate information from the position detection unit 532 in the frame corresponding to the captured image based on the coordinate information from the position detection unit 532, and supplies information indicating the trim boxes to the trim image generation control unit 535.

Trim Process

Next, a trim process in the image processing device 11 having the control unit 35 in FIG. 22 will be described with reference to the flowchart in FIG. 23.

The processes in steps S516 and S517 in the flowchart in FIG. 22 are fundamentally the same as those in steps S316 and S317 in the flowchart in FIG. 15, and thus the description thereof will be omitted.

In step S511, the subject tracking unit 55 performs the subject tracking process described in the flowchart in FIG. 6, and supplies the coordinate information for the subject area to the control unit 35.

In step S512, the coordinate information obtaining unit 531 obtains the coordinate information for the subject area from the subject tracking unit 55 and supplies the obtained coordinate information to the position detection unit 532.

In step S513, the position detection unit 532 detects the central position of the subject area in a certain frame of the input image based on the coordinate information for the subject area from the coordinate information obtaining unit 531. The position detection unit 532 determines whether or not the detected central position of the subject area is positioned inside a predetermined area in the input image.

Figure 24:
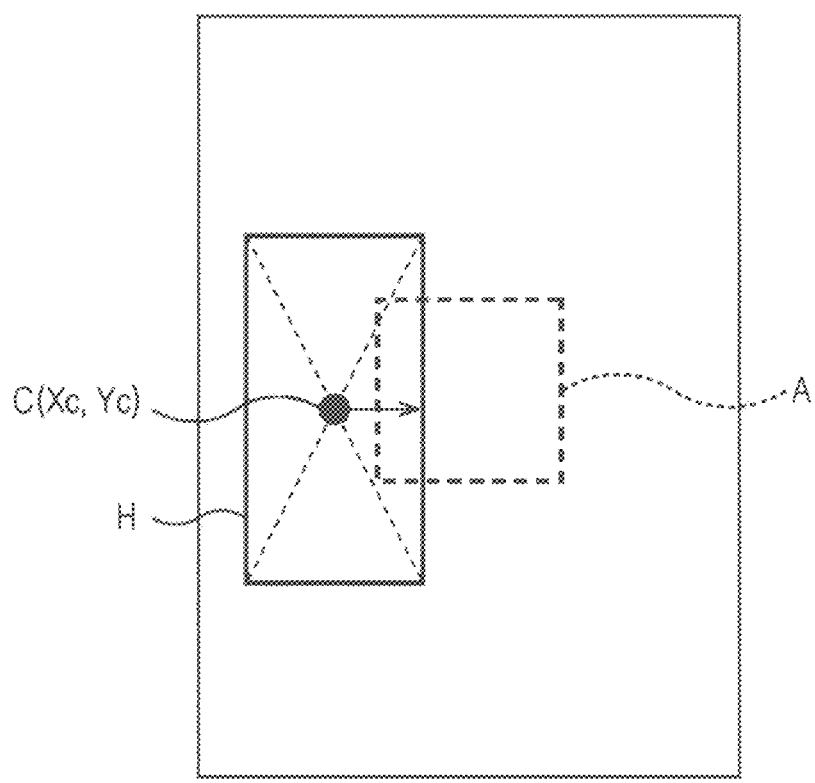
FIG. 24 is a diagram illustrating the detection of a central position of a subject area.

Specifically, the position detection unit 532 monitors the coordinates for the central position of the subject area in the input image for each frame, and, as shown in FIG. 24, determines whether or not the coordinates C(Xc,Yc) for the central position of the subject area indicated by the subject box H becomes coordinates inside the area A marked with the broken lines in the input image. The area A is assumed to be set around the center of the input image.

In step S513, if it is determined that the central position of the subject area is not positioned inside a predetermined area, the flow returns to step S511, and the processes in steps S511 to S513 are repeated until coordinate information regarding a frame where the central position of the subject area is positioned inside a predetermined area is supplied from the subject tracking unit 55.

On the other hand, in step S513, if it is determined that the central position of the subject area is positioned inside the predetermined area, that is, if coordinate information regarding a frame where the central position of the subject area is positioned inside the predetermined area is supplied from the subject tracking unit 55, the position detection unit 532 supplies information for instructing image capture to the imager 32. In addition, the position detection unit 532 supplies information indicating that the central position of the subject area is positioned inside the predetermined area, to the raw data recording control unit 533 and supplies the coordinate information for the subject area from the coordinate information obtaining unit 531 to the trim box setting unit 534.

In this way, since the shutter operation is performed when a moving subject comes around the center of the input image, it is possible to obtain a captured image of a stable composition.

Hereinafter, a frame when the central position of the subject area is positioned inside a predetermined area is referred to as a shutter frame.

In step S514, if the information indicating that the central position of the subject area is positioned inside the predetermined area is supplied from the position detection unit 532, the raw data recording control unit 533 controls the memory controller 58 and makes raw data regarding the shutter frame recorded in the DRAM 40.

In step S515, the trim box setting unit 534 sets the number of trim boxes according to the size of the subject area indicated by the coordinate information from the position detection unit 532 in the shutter frame based on the coordinate information from the position detection unit 532, so as to contain the subject area.

Here, although the trim box setting unit 534 basically sets the trim boxes as described in FIGS. 16 to 18, in a case where the size of the subject area is larger than the captured image (takes up a large ratio), none of the plurality of trim images generated by the trim boxes containing the subject area is highlighted, and thus the smaller number of trim boxes is set. In contrast, in a case where the size of the subject area is smaller than the input image, the trim boxes containing the subject area may be set by various methods, and thus the larger number of trim boxes is set.

In this way, the number of the trim boxes according to the size of the subject area is set in the captured image. The trim box setting unit 534 supplies information indicating the set plurality of trim boxes to the trim image generation control unit 535.

According to the above-described process, the number of the trim boxes according to the size of the subject area containing the subject area in the image captured according to a position of the subject is set, and then the plurality of trim images are generated. Thereby, it is possible to provide suitable trim images without inconvenient operations after the photographing or advanced techniques during the photographing without the user's shutter operation.

Particularly, since the number of trim boxes is determined according to the size of the subject area, if the subject area is large, the capacity of the recording medium 39 is saved by suppressing the generation of similar trim images, and if the subject area is small, it is possible to provide trim images in more diversified compositions to the user by generating more trim images.

In the above description, although the shutter operation is performed when the coordinates for the central position of the subject area become coordinates in the predetermined area in the input image, that is, the central position of the subject area is positioned inside the predetermined area, in contrast, when the coordinates for the central position of the subject area become coordinates outside the predetermined area, that is, the central position of the subject area is positioned outside the predetermined area, the shutter operation may be performed.

In the above description, although the configuration where the shutter operation is performed by whether or not the moving subject is positioned inside a predetermined area or outside the predetermined area has been described, the shutter operation may be performed while the moving subject stops for a predetermined time.

Another Functional Configuration Example of Control Unit

Figure 25:
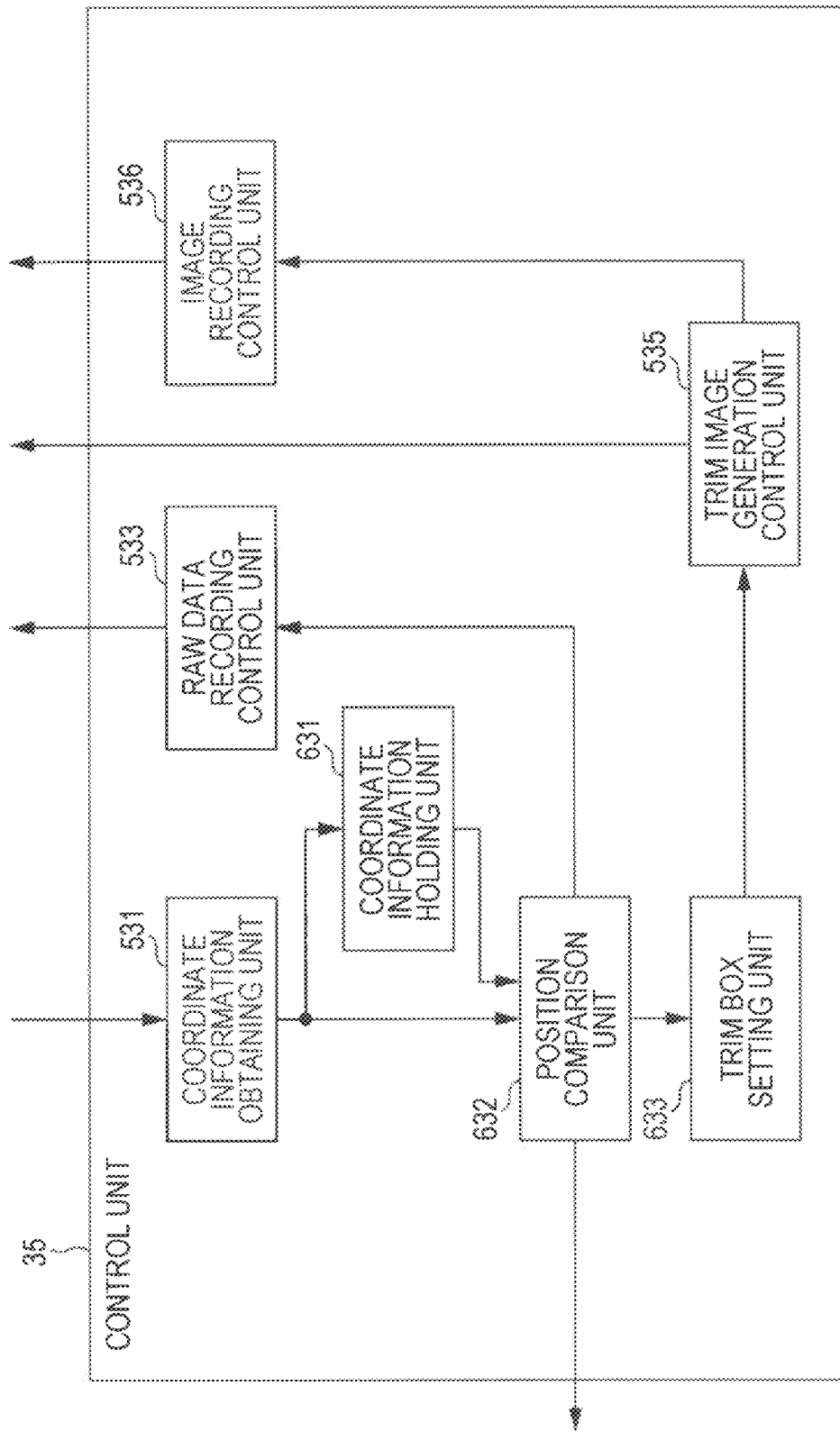
FIG. 25 is a block diagram illustrating another functional configuration example of the control unit.

FIG. 25 shows a functional configuration example of the control unit 35 which sets trim boxes in a captured image when a shutter operation is performed while a moving subject stops for a predetermined time.

In the control unit 35 in FIG. 25, like names and reference numerals are added to the constituent elements having the same functions as those in the control unit 35 in FIG. 22, and the description thereof will be appropriately omitted.

The control unit 35 in FIG. 25 is different from the control unit 35 in FIG. 22 in that a coordinate information holding unit 631 is newly provided, and a position comparison unit 632 and a trim box setting unit 633 are provided instead of the position detection unit 532 and the trim box setting unit 534.

In addition, the coordinate information obtaining unit 531 in FIG. 25 obtains coordinate information for a subject area supplied from the subject tracking unit 55 for each frame of an input image, and supplies the obtained coordinate information to the coordinate information holding unit 631 and the position comparison unit 632.

The coordinate information holding unit 631 holds the coordinate information for the subject area supplied from the coordinate information obtaining unit 531 during several frames so as to be delayed by several frames, and then supplies the delayed coordinate information to the position comparison unit 632.

The position comparison unit 632 compares the coordinate information for the subject area delayed by several frames from the coordinate information holding unit 631 with the coordinate information for the subject area from the coordinate information obtaining unit 531 and thus compares the position of the subject of several frames prior with the position of the subject in this frame. The position comparison unit 632 supplies information for instructing image capture to the imager 32 based on the comparison result. Thereby, the digital signal processing unit 33 is supplied with raw data corresponding to the captured image. In addition, the position comparison unit 632 supplies information corresponding to the comparison result to the raw data recording control unit 533 and supplies the coordinate information for the subject area from the coordinate information holding unit 631 to the trim box setting unit 633 according to the comparison result.

The trim box setting unit 633 sets the number of trim boxes according to the size and the position of the subject area indicated by the coordinate information from the position comparison unit 632 in the frame corresponding to the captured image (shutter frame) based on the coordinate information from the position comparison unit 632, and supplies information indicating the trim boxes to the trim image generation control unit 535.

Trim Process

Next, a trim process in the image processing device 11 having the control unit 35 in FIG. 25 will be described with reference to the flowchart in FIG. 26.

Figure 23:
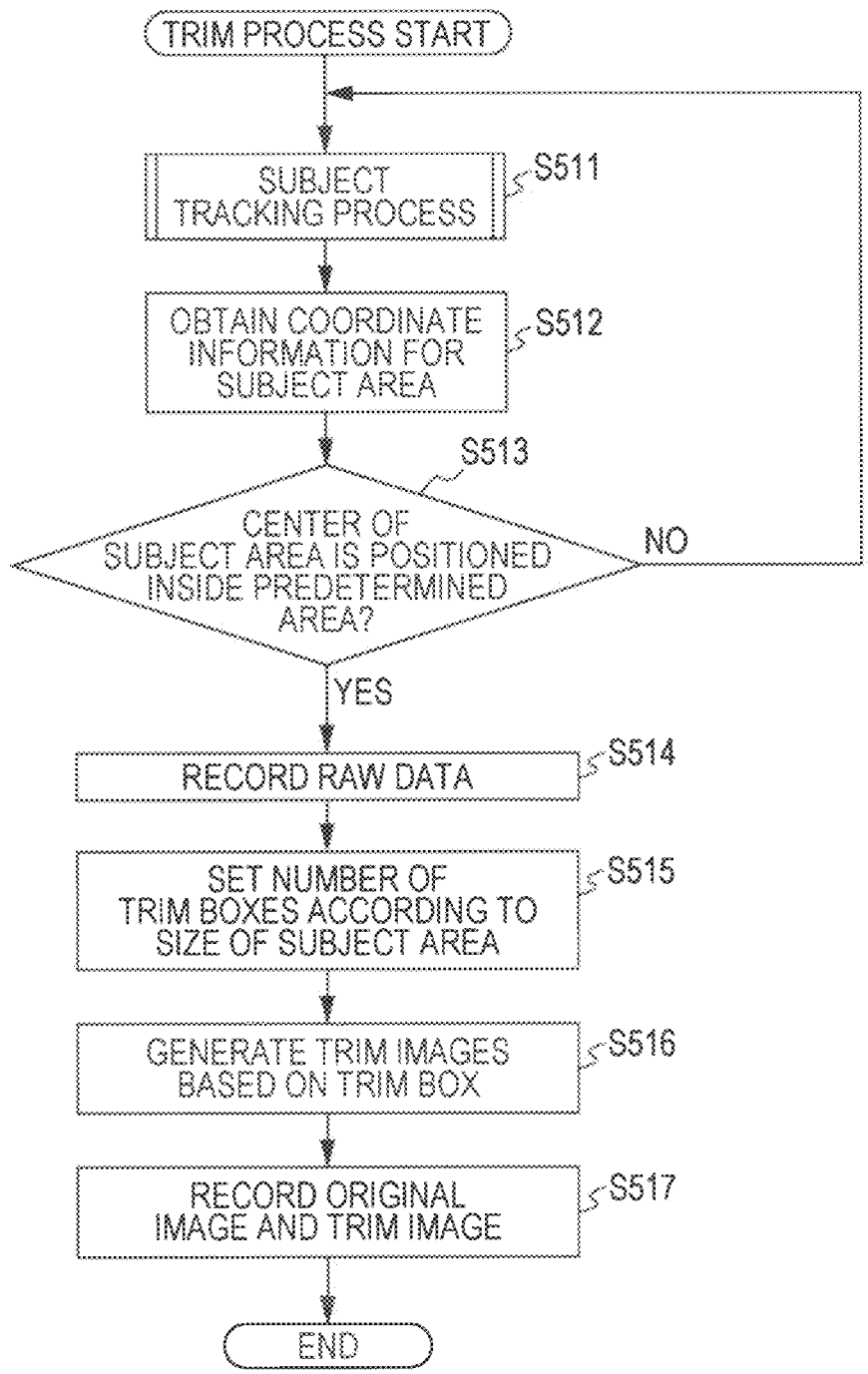
FIG. 23 is a flowchart illustrating a trim process.
Figure 26:
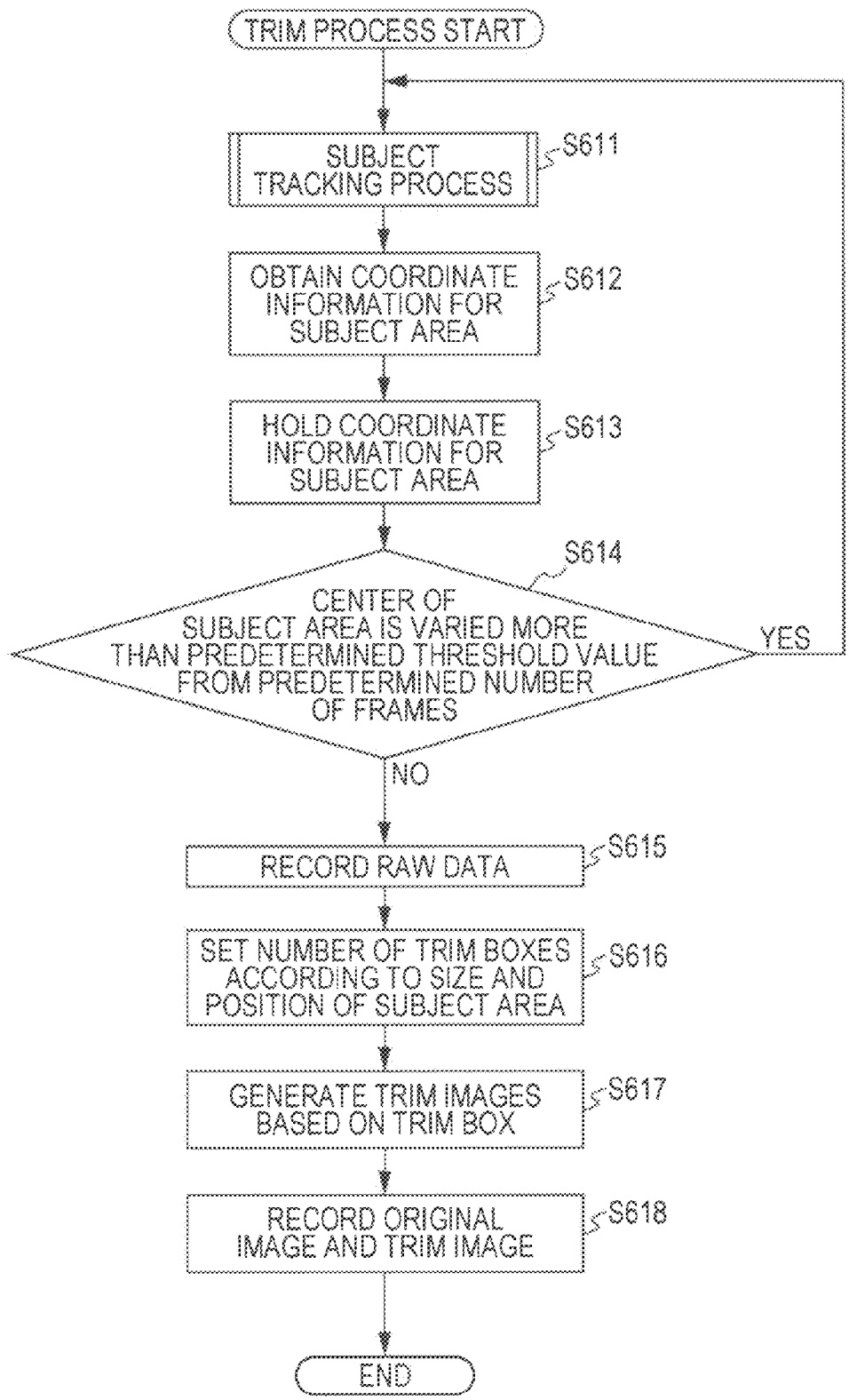
FIG. 26 is a flowchart illustrating a trim process.

The processes in steps S611, S612, S617, and S618 in the flowchart in FIG. 26 are fundamentally the same as those in steps S511, S512, S516, and S517 in the flowchart in FIG. 23, and thus the description thereof will be omitted.

In step S613, the coordinate information holding unit 631 holds coordinate information for the subject area from the coordinate information obtaining unit 531 and supplies coordinate information for the subject area of predetermined number of frames prior to the position comparison unit 632.

In step S614, the position comparison unit 632 compares the coordinate information for the subject area of predetermined number of frames prior from the coordinate information holding unit 631 with the coordinate information for the subject area in this frame from the coordinate information obtaining unit 531, and determines whether or not the center of the subject area is varied (moved) more than a predetermined threshold value from a predetermined number of frames.

Figure 27:
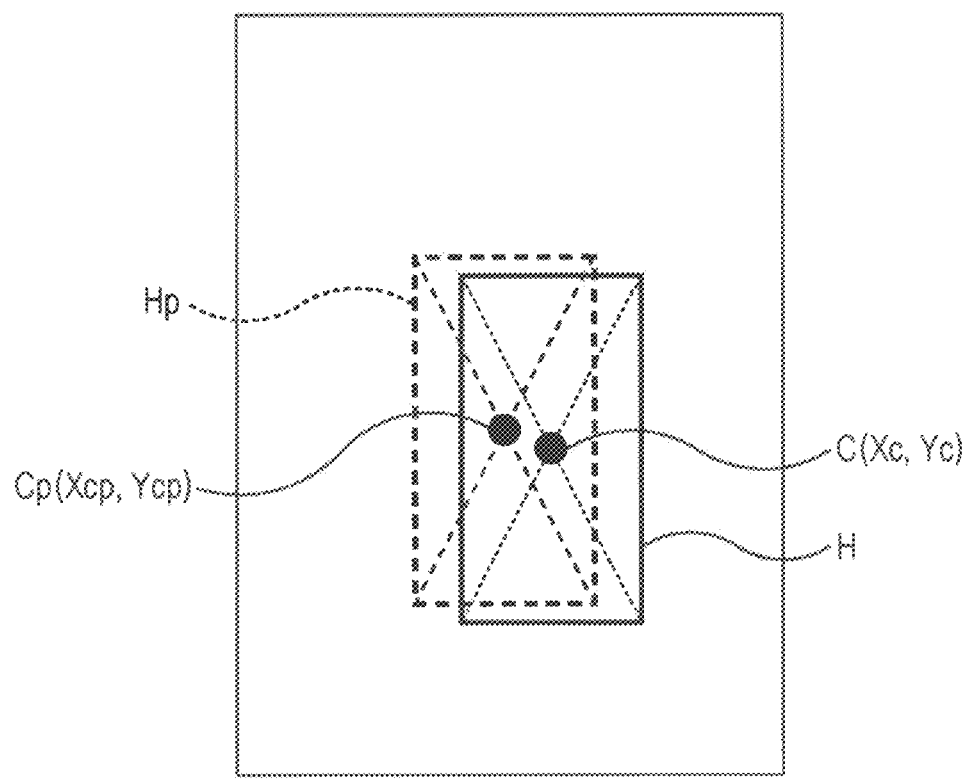
FIG. 27 is a diagram illustrating variations in the central position of the subject area.

Specifically, the position comparison unit 632, as shown in FIG. 27, determines whether or not the distance between the coordinates Cp(Xcp, Ycp) for the central position of the subject box (subject area) Hp of a predetermined number of frames prior and the coordinates C(Xc, Yc) for the central position of the subject box (subject area) H in this frame is more than a predetermined threshold value.

In step S614, if it is determined that the center of the subject area is varied more than the predetermined threshold value from the predetermined number of frames, the flow returns to step S611, and the processes in steps S611 to S614 are repeated.

On the other hand, in step S614, if the center of the subject area is not varied more than the predetermined threshold value from the predetermined number of frames, that is, the subject is hardly moved during the predetermined number of frames, the position comparison unit 632 supplies information for instructing image capture to the imager 32. In addition, the position comparison unit 632 supplies information indicating that the subject is not moved during the predetermined number of frames, to the raw data recording control unit 533, and supplies the coordinate information for the subject area from the coordinate information obtaining unit 531 to the trim box setting unit 633.

In this way, the shutter operation is performed while the moving subject stops for a predetermined time, and thus it is possible to obtain the captured image of the subject in a stable state.

In step S615, if the information indicating that the subject is not moved during the predetermined number of frames is supplied from the position comparison unit 632, the raw data recording control unit 533 controls the memory controller 58 and makes raw data regarding the shutter frame recorded in the DRAM 40.

In step S616, the trim box setting unit 633 sets the number of trim boxes according to the size and the position of the subject area indicated by the coordinate information from the position comparison unit 632 in the shutter frame based on the coordinate information from the position comparison unit 632, so as to contain the subject area.

Here, although the trim box setting unit 633 sets the number of trim boxes according to the size of the subject area in the same manner as the trim box setting unit 534 in FIG. 22, the trim box setting unit 633 sets the larger number of trim boxes in the central direction of the captured image using the coordinates for the central position of the subject area as a reference. For example, in a case where the subject area is positioned to the left side of the center of the captured image, the larger number of trim boxes is set in the right side of the captured image.

In this way, the number of trim boxes according to the size and the position of the subject area is set in the captured image. The trim box setting unit 633 supplies information indicating the set plurality of trim boxes to the trim image generation control unit 535.

According to the above-described process, the number of trim boxes according to the size and the position of the subject area, containing the subject area, is set in the image captured depending on the motion state of the subject and then a plurality of trim images are generated. Thereby, since the user does not perform a shutter operation, it is possible to provide suitable trim images without inconvenient operations after the photographing or advanced techniques during the photographing.

Particularly, since the number of trim boxes is determined according to the size of the subject area, if the subject area is large, the capacity of the recording medium 39 is saved by suppressing the generation of similar trim images, and if the subject area is small, it is possible to provide trim images in more diversified compositions to the user by generating more trim images.

Further, since the number of trim boxes is determined according to the position of the subject area, even in a case where the subject is positioned at an end side of the captured image, it is possible to provide trim images in a spatially enlarged composition by setting many trim boxes in the central direction of the captured image.

In the above description, although the configuration where the shutter operation is performed while the moving subject stops for predetermined time in an input image has been described, the shutter operation may be performed when the size of the subject reaches a predetermined size in the input image.

Another Functional Configuration Example of Control Unit

Figure 28:
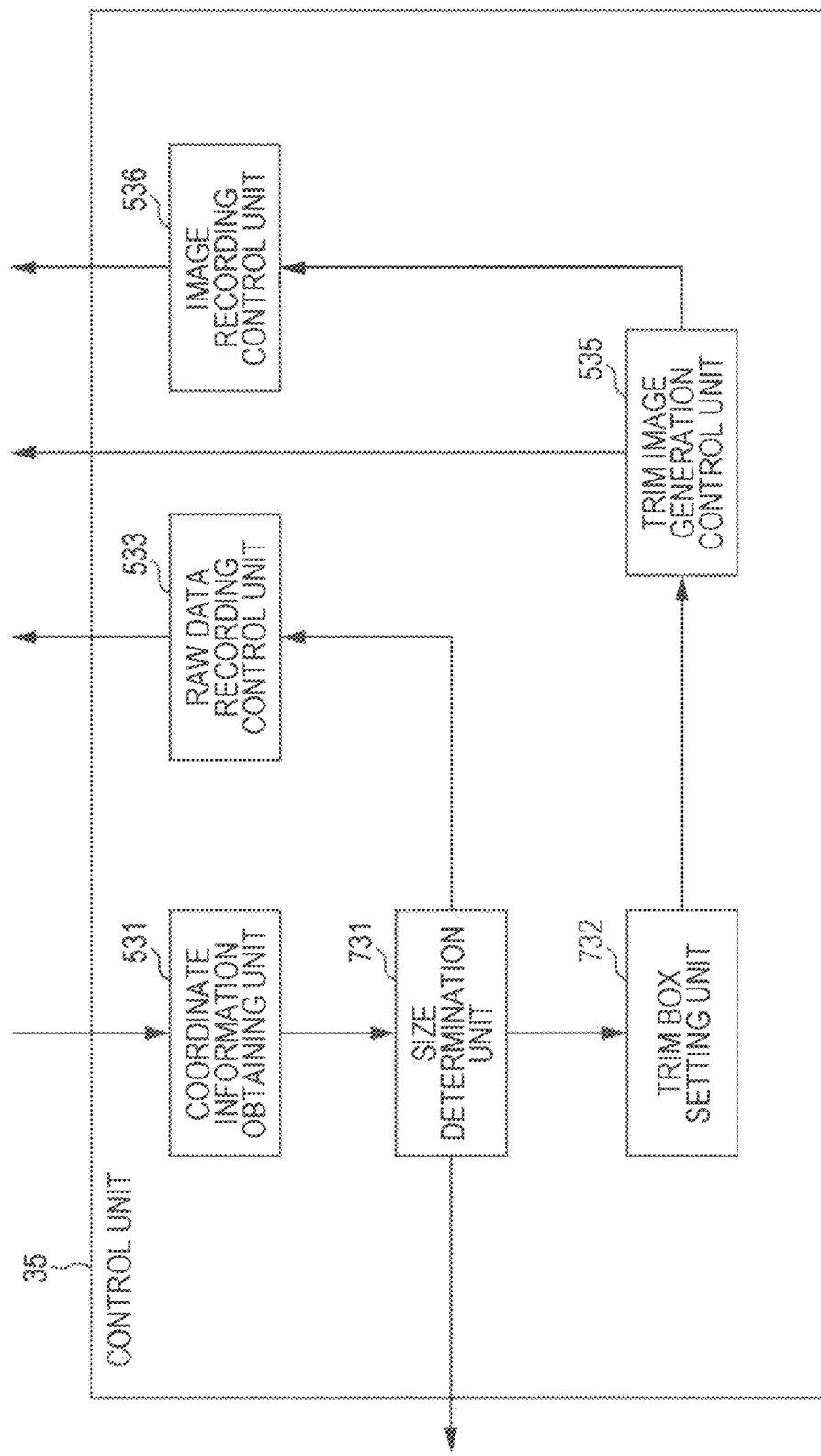
FIG. 28 is a block diagram illustrating another functional configuration example of the control unit.

FIG. 28 shows a functional configuration example of the control unit 35 which sets trim boxes in a captured image when a shutter operation is performed in a case where the size of a subject reaches a predetermined size.

In the control unit 35 in FIG. 28, like names and reference numerals are added to the constituent elements having the same functions as those in the control unit 35 in FIG. 22, and the description thereof will be appropriately omitted.

The control unit 35 in FIG. 28 is different from the control unit 35 in FIG. 22 in that a size determination unit 731 and a trim box setting unit 732 are provided instead of the position detection unit 532 and the trim box setting unit 534.

The size determination unit 731 determines the size of a subject area in a certain frame of an input image based on coordinate information for the subject area from the coordinate information obtaining unit 531, and supplies information for instructing image capture to the imager 32 depending on the determination result. Thereby, the digital signal processing unit 33 is supplied with raw data corresponding to the captured image. In addition, the size determination unit 731 supplies information corresponding to the determination result to the raw data recording control unit 533 and supplies the coordinate information for the subject area from the coordinate information obtaining unit 531 to the trim box setting unit 732.

The trim box setting unit 732 sets the number of trim boxes according to the size and the position of the subject area indicated by the coordinate information from the size determination unit 731 in the frame corresponding to the captured image (shutter frame) based on the coordinate information from the size determination unit 731, and supplies information indicating the trim boxes to the trim image generation control unit 535.

Trim Process

Next, a trim process in the image processing device 11 having the control unit 35 in FIG. 28 will be described with reference to the flowchart in FIG. 29.

Figure 29:
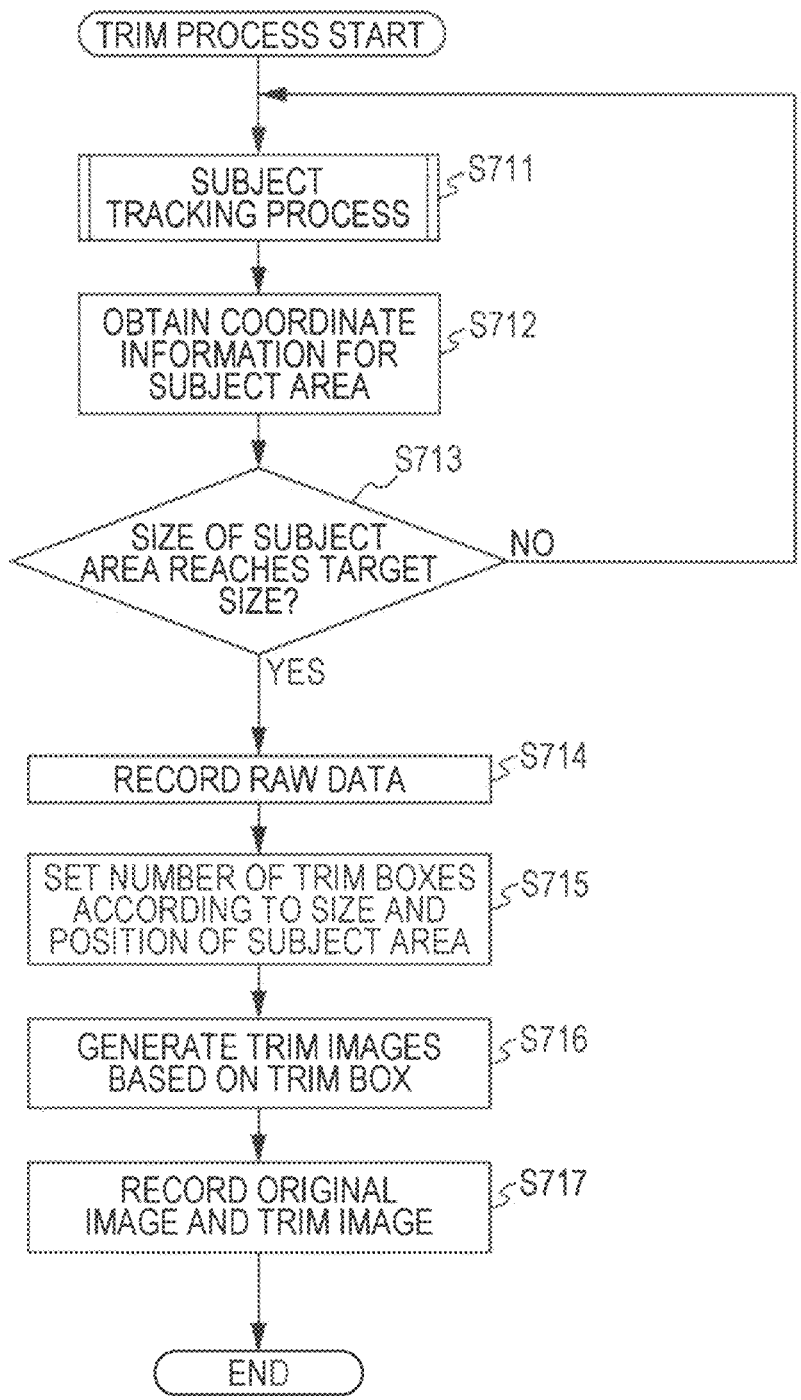
FIG. 29 is a flowchart illustrating a trim process.

The processes in steps S711, S712, S716, and S717 in the flowchart in FIG. 29 are fundamentally the same as those in steps S511, S512, S517, and S518 in the flowchart in FIG. 23, and thus the description thereof will be omitted.

In step S713, the size determination unit 731 determines whether or not the size of a subject area in a certain frame of an input image reaches, for example, a target size decided in advance by the user, based on the coordinate information for the subject area from the coordinate information obtaining unit 531.

Specifically, the size determination unit 731 monitors the width and the height of the subject area in the input image for each frame, and determines whether or not, as shown in the left part of FIG. 30, in the input image, the width Width and the height Height of the subject area indicated by the subject box H becomes the same or substantially the same as the rectangular area H_m with the width Width_m and the height Height_m which is the target size, as shown in the right part of FIG. 30.

In step S713, if it is determined that the size of the subject area does not become the target size, the flow returns to step S711, and the processes in steps S711 to S713 are repeated until the coordinate information regarding a frame in which the size of the subject area becomes the target size is supplied from the subject tracking unit 55.

On the other hand, if it is determined that the size of the subject area becomes the target size in step S713, that is, the coordinate information regarding the frame in which the size of the subject area becomes the target size is supplied from the subject tracking unit 55, the size determination unit 731 supplies information for instructing image capture to the imager 32. The size determination unit 731 supplies information indicating that the size of the subject area becomes the target size, to the raw data recording control unit 533, and supplies the coordinate information for the subject area from the coordinate information obtaining unit 531 to the trim box setting unit 732.

In this way, since the shutter operation is performed when the size of the subject reaches the target size in the input image through a variation in the distance between the subject and the image processing device 11, it is possible to obtain the captured image of the subject with a desired size.

In step S714, if the information indicating that the size of the subject area becomes the target size is supplied from the size determination unit 731, the raw data recording control unit 533 controls the memory controller 58 and makes the raw data regarding the shutter frame in the DRAM 40.

In step S715, the trim box setting unit 732 sets the number of trim boxes according to the size and the position of the subject area indicated by the coordinate information from the size determination unit 731 in the shutter frame based on the coordinate information from the size determination unit 731, so as to contain the subject area.

Here, the trim box setting unit 732 sets the number of trim boxes according to the size and the position of the subject area in the same manner as the trim box setting unit 633 in FIG. 25. However, the size of the subject area corresponds to the target size decided in advance, and thus the number of trim boxes may be correlated with the target size in advance.

In this way, the number of trim boxes according to the size and the position of the subject area is set in the captured image. The trim box setting unit 732 supplies information indicating the set plurality of trim boxes to the trim image generation control unit 535.

According to the above-described process, the number of trim boxes according to the size and the position of the subject area, containing the subject area, is set in the image captured depending on the size of the subject (the distance between the subject and the image processing device 11), and the plurality of trim images are generated. Thereby, since the user does not perform a shutter operation, it is possible to provide suitable trim images without inconvenient operations after the photographing or advanced techniques during the photographing.

Particularly, since the number of trim boxes is determined according to the size of the subject area, if the subject area is large, the capacity of the recording medium 39 is saved by suppressing the generation of similar trim images, and if the subject area is small, it is possible to provide trim images in more diversified compositions to the user by generating more trim images.

Further, since the number of trim boxes is determined according to the position of the subject area, even in a case where the subject is positioned at an end side of the captured image, it is possible to provide trim images in a spatially enlarged composition by setting many trim boxes in the central direction of the captured image.

In addition, in the above description, although the width and the height of the subject area are decided as the target size in advance, either of the width or the height of the subject area may be the target size.

Further, in the above description, although the shutter operation is performed when the size of the subject area reaches the target size, if the subject is a figure, the digital signal processing unit 33 is provided with a face detector which detects the face of the figure, and the shutter operation may be performed when the ratio of the size of a subject area and the size of a face area which is an area of the face detected by the face detector reaches a predetermined target value.

Moreover, in the trim process, the image-captured subject is not limited to figures.

In the above description, although the configuration where the shutter operation is performed depending on the states of the subject, which is not limited to figures, has been described, the shutter operation may be performed depending on a detected facial expression after detecting the face of a figure which is a subject.

Functional Configuration Example of Another Image Processing Device

Figure 31:
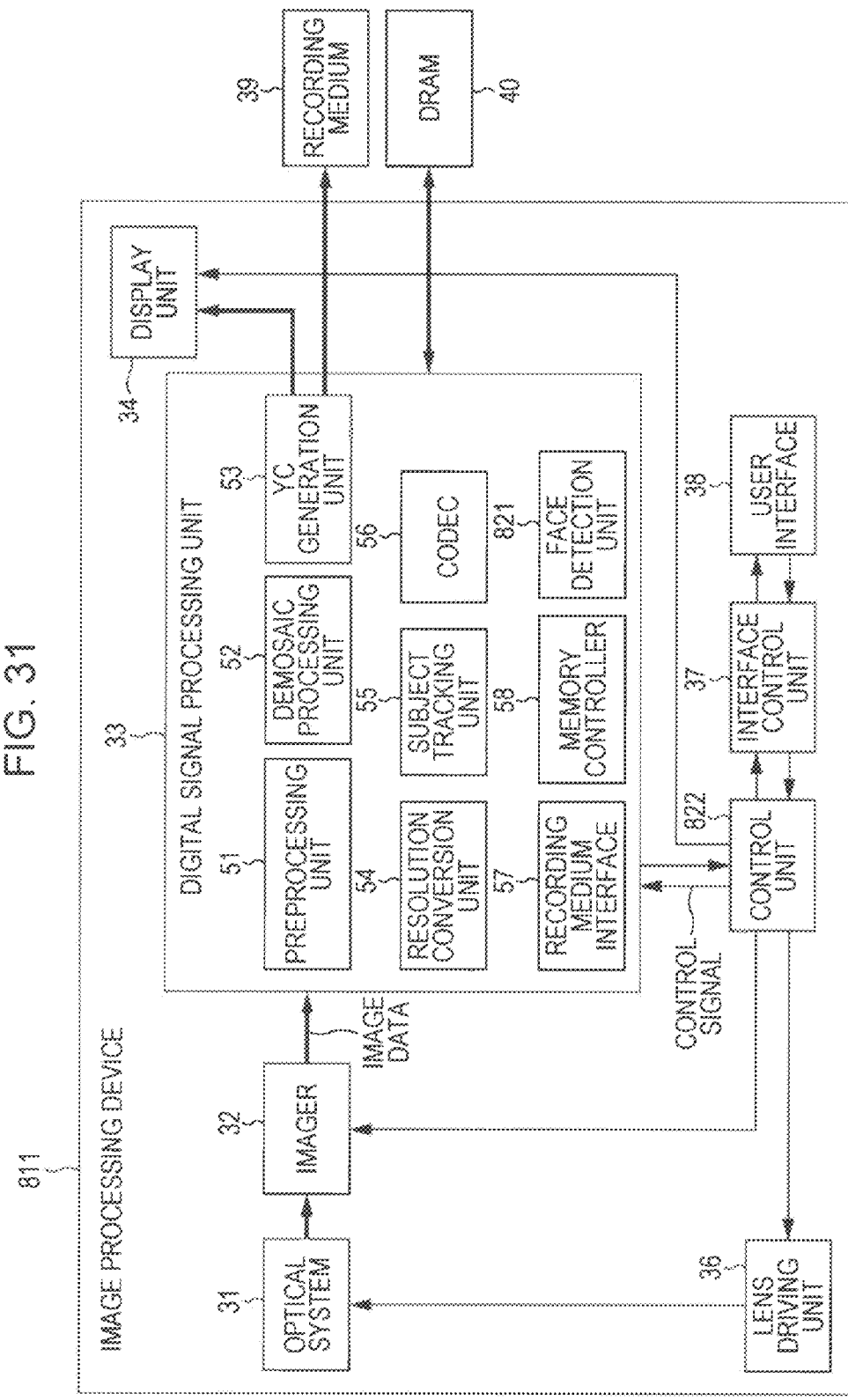
FIG. 31 is a block diagram illustrating another configuration example of the image processing device.

FIG. 31 shows a configuration example of an image processing device which detects the face of a figure which is a subject and performs a shutter operation depending on the detected facial expression.

In the image processing device 811 in FIG. 31, like names and reference numerals are added to the constituent elements having the same functions as those in the image processing device 11 in FIG. 1, and the description thereof will be appropriately omitted.

The image processing device 811 in FIG. 31 is different from the image processing device 11 in FIG. 1 in that a face detection unit 821 is newly provided in the digital signal processing unit 33 and a control unit 822 is provided instead of the control unit 35.

The face detection unit 821 detects the face from a subject area of a figure which is a subject detected by the subject tracking unit 55, in an input image displayed by image data, based on the image data including the luminance signal and the color signals generated by the YC generation unit 53. The face detection unit 821 detects the facial expression from the detected face of the subject and supplies information indicating the facial expression to the control unit 822.

The control unit 822 controls the image capture of the imager 32 based on the information indicating the facial expression from the face detection unit 821, and performs the trim process for the obtained captured image.

Functional Configuration Example of Control Unit

Next, a functional configuration example of the control unit 822 will be described with reference to FIG. 32.

Figure 32:
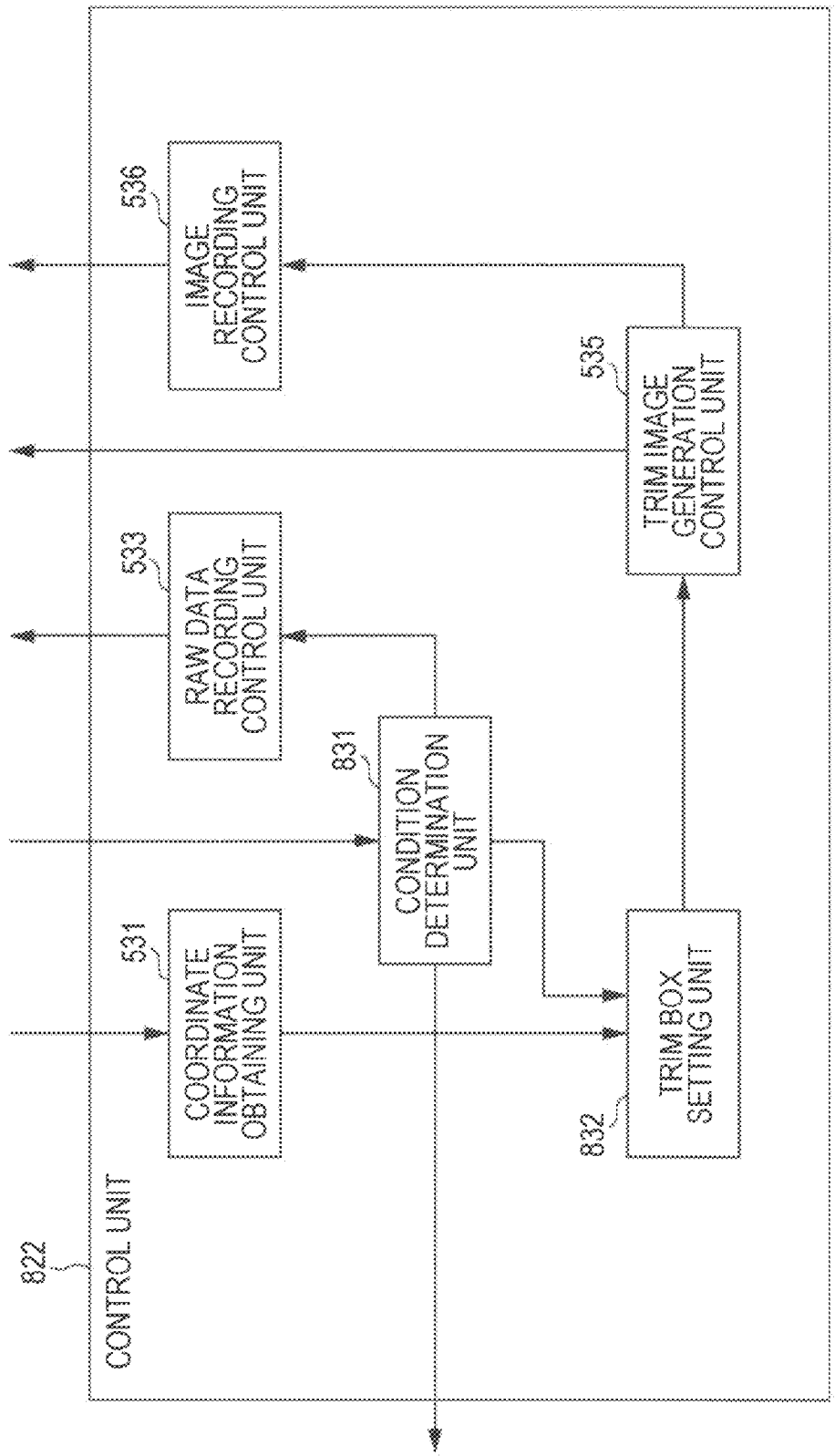
FIG. 32 is a block diagram illustrating a functional configuration example of the control unit in FIG. 31.

In the control unit 822 in FIG. 32, like names and reference numerals are added to the constituent elements having the same functions as those in the control unit 35 in FIG. 22, and the description thereof will be appropriately omitted.

The control unit 822 in FIG. 32 is different from the control unit 35 in FIG. 22 in that a condition determination unit 831 and a trim box setting unit 832 are provided instead of the position detection unit 532 and the trim box setting unit 534.

In addition, the coordinate information obtaining unit 531 in FIG. 32 obtains coordinate information for a subject area supplied from the subject tracking unit 55 for each frame of an input image, and supplies the obtained coordinate information to the trim box setting unit 832.

The condition determination unit 831 determines whether or not the facial expression of the subject satisfies a predetermined condition based on the information indicating the facial expression from the face detection unit 821, and supplies information for instructing image capture to the imager 32 corresponding to the determination result. Thereby, the digital signal processing unit 33 is supplied with raw data corresponding to the captured image. In addition, the condition determination unit 831 supplies information corresponding to the determination result to the raw data recording control unit 533 and the trim box setting unit 832.

If the information corresponding to the determination result is supplied from the condition determination unit 831, the trim box setting unit 832 sets the number of trim boxes according to the position of the subject area indicated by the coordinate information from the coordinate information obtaining unit 531 in the frame corresponding to the captured image (shutter frame) based on the coordinate information from the coordinate information obtaining unit 531, and supplies information indicating the trim boxes to the trim image generation control unit 535.

Trim Process

Next, a trim process in the image processing device 811 in FIG. 31 having the control unit 822 in FIG. 32 will be described with reference to the flowchart in FIG. 33.

Figure 33:
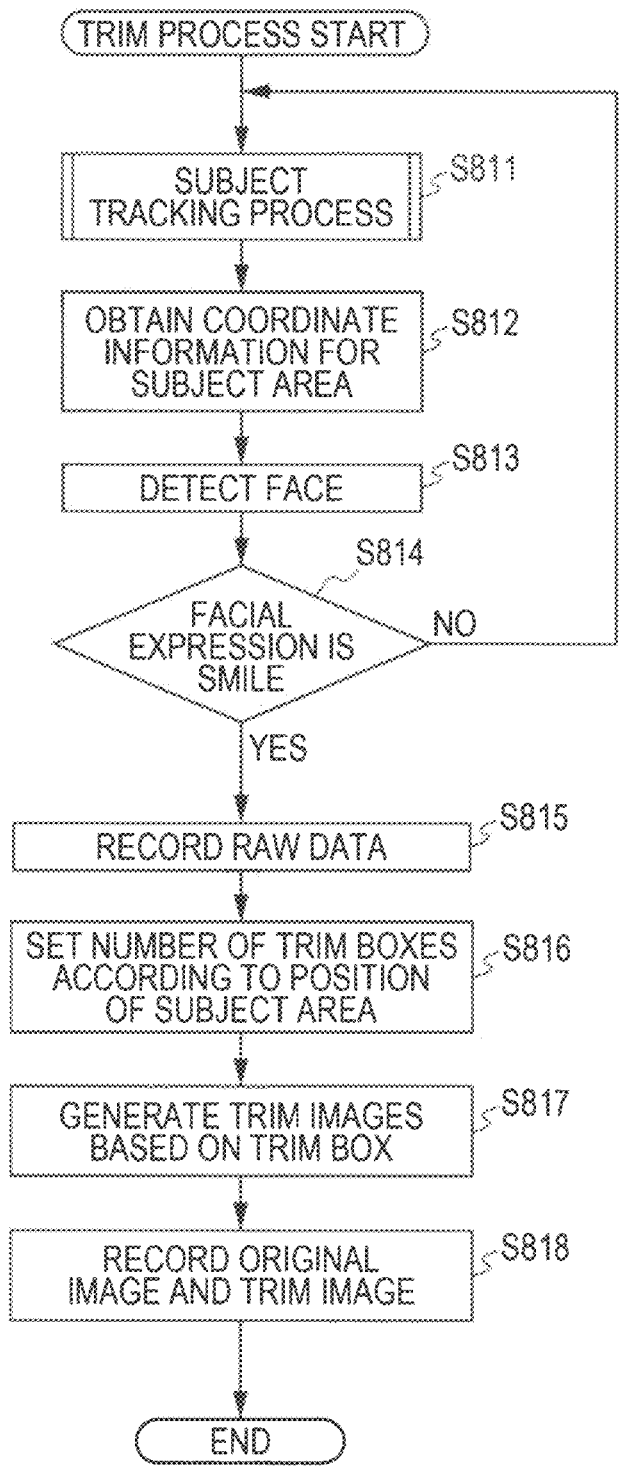
FIG. 33 is a flowchart illustrating a trim process.

The processes in steps S811, S812, S817, and S818 in the flowchart in FIG. 33 are fundamentally the same as those in steps S511, S512, S516, and S517 in the flowchart in FIG. 23, and thus the description thereof will be omitted.

In step S813, the face detection unit 821 detects the face from the subject area of the figure which is a subject detected by the subject tracking process in the subject tracking unit 55, in the input image. Further, the face detection unit 821 detects a facial expression from the detected face of the subject, and supplies the information indicating the facial expression to the control unit 822.

In step S814, the condition determination unit 831 determines whether or not the subject is smiling based on the information indicating the facial expression from the face detection unit 821.

Specifically, the condition determination unit 831 monitors the information indicating a facial expression supplied from the face detection unit 821 for each frame, and determines whether or not, in the input image, as shown in the left part of FIG. 34, the facial expression in the face area F contained in the subject box (subject area) H is a smile as shown in the right part of FIG. 34.

In step S814, if it is determined that the facial expression is not a smile, the flow returns to step S811, and the processes in steps S811 to S814 are repeated until coordinate information regarding a frame in which the facial expression is a smile is supplied from the subject tracking unit 55.

On the other hand, in step S814, if it is determined that the facial expression is a smile, that is, the coordinate information regarding the frame in which the facial expression is a smile is supplied from the subject tracking unit 55, the condition determination unit 831 supplies information for instructing image capture to the imager 32. Further, the condition determination unit 831 supplies information indicating that the facial expression is a smile to the raw data recording control unit 533 and the trim box setting unit 832.

In this way, since the shutter operation is performed when the facial expression of the figure which is a subject is a smile, it is possible to obtain the captured image of the subject with a suitable expression.

In step S815, if the information indicating that the facial expression is a smile is supplied from the condition determination unit 831, the raw data recording control unit 533 controls the memory controller 58 and makes raw data regarding the shutter frame recorded in the DRAM 40.

In step S816, the trim box setting unit 832 sets the number of trim boxes according to the position of the subject area indicated by the coordinate information from the coordinate information obtaining unit 531 in the shutter frame based on the coordinate information from the coordinate information obtaining unit 531, so as to contain the subject area.

Here, the trim box setting unit 832 sets the number of trim boxes according to the distance between the central position of the subject area and the central position of the captured image. Specifically, if the central position of the subject area is greatly apart from the central position of the captured image, the smaller number of trim boxes is set.

In this way, the number of trim boxes according to the position of the subject area is set in the captured image. The trim box setting unit 832 supplies information indicating the set plurality of trim boxes to the trim image generation control unit 535.

According to the above-described process, the number of trim boxes according to the position of the subject area, containing the subject area, is set in the image captured depending on an expression of the figure which is the subject and a plurality of trim images are generated. Thereby, since the user does not perform a shutter operation, it is possible to provide suitable trim images without inconvenient operations after the photographing or advanced techniques during the photographing.

Particularly, in a case where the central position of the subject area is greatly apart from the central position of the captured image, since the smaller number of trim boxes is set, even if the facial expression of a figure which is a subject is a smile, it is possible to suppress the generation of trim images and save the capacity of the recording medium 39 when a position of the subject is not good.

In the above description, although the configuration where the original image and the trim images are generated and recorded has been described, the trim box information indicating trim boxes may be added to the original image as metadata, and only the original image may be recorded. Thereby, it is possible to generate trim images based on the metadata including the trim box information in an information processing device such as a personal computer when the original image is edited.

Also, in the above description, although a state of the subject tracked by the subject tracking unit 55 is used as a trigger of the shutter, an output from a detector which detects the position, the motion, or the like of the subject for each frame may be used as the trigger of the shutter instead of the subject tracking unit 55.

The above-described series of processes may be performed by hardware or software. When a series of processes is performed by software, programs constituting the software are installed from a program recording medium to a computer embedding dedicated hardware therein, or, for example, a general personal computer which can execute various kinds of functions by installing various kinds of programs.

Figure 35:
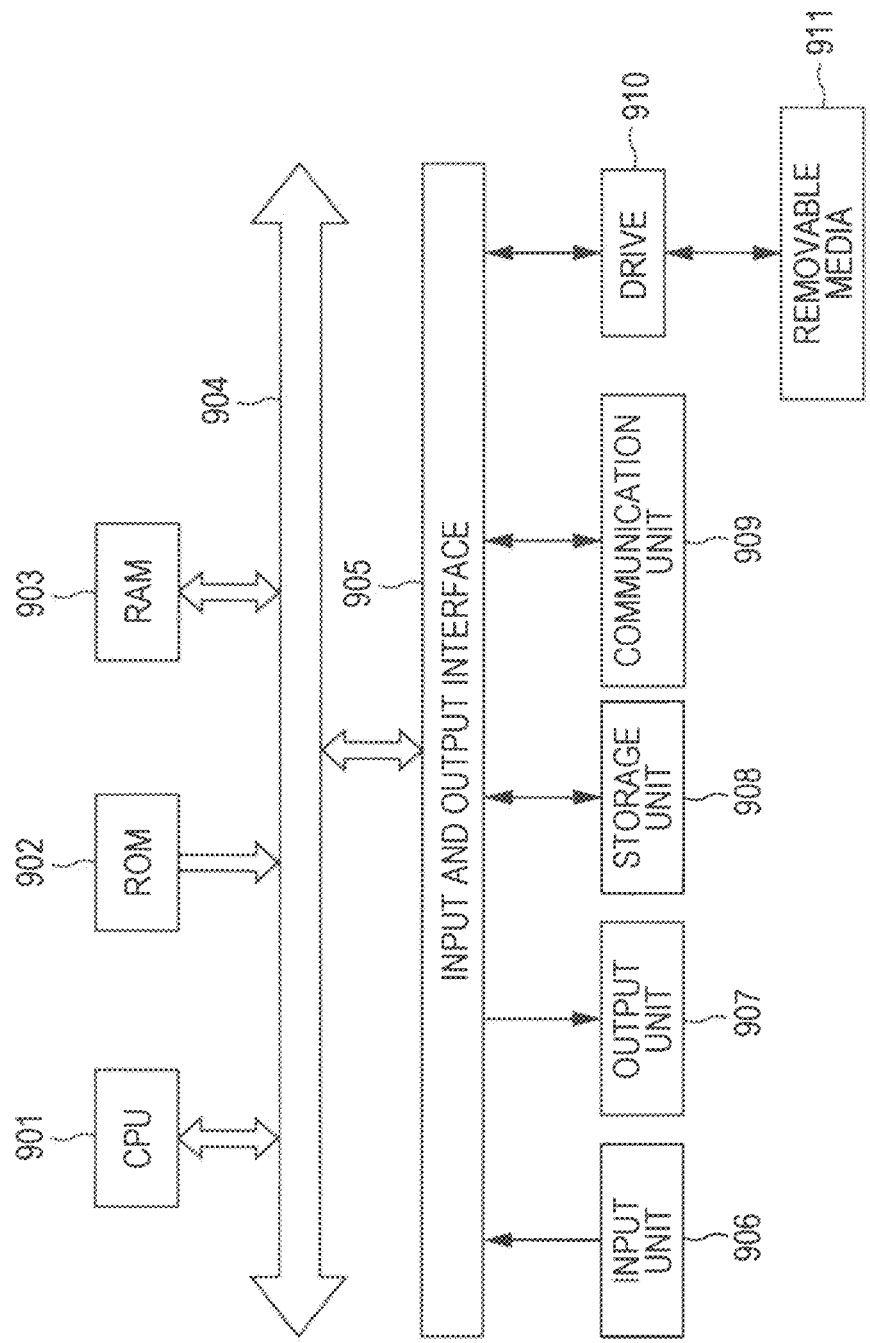
FIG. 35 is a block diagram illustrating a hardware configuration example of a computer.

FIG. 35 is a block diagram illustrating a hardware configuration example of a computer which executes the series of processes using a program.

In the computer, a CPU (central processing unit) 901, a ROM (read only memory) 902, and a RAM (random access memory) 903 are connected to each other via a bus 904.

Also, the bus 904 is connected to an input and output interface 905. The input and output interface 905 is connected to an input unit 906 including a keyboard, a mouse, a microphone, and the like, an output unit 907 including a display, a speaker and the like, a storage unit 908 including a hard disc, a nonvolatile memory and the like, a communication unit 909 including a network interface and the like, and a drive 910 which drives removal media 911 such as magnetic discs, optical discs, magnetic optical discs, or semiconductor memories.

In the computer configured in this way, the CPU 901 loads, for example, a program stored in the storage unit 908 to the RAM 903 for execution via the input and output interface 905 and bus 904, thereby performing the series of processes.

The program executed by the computer (the CPU 901) is recorded in the removable media 911 which are package media including magnetic discs (including flexible discs), optical discs (including CD-ROMs (Compact Disc-Read Only Memory) and DVDs (Digital Versatile Disc)), magnetic optical discs, semiconductor memories, or the like, or is provided using a wired or wireless communication medium such as a LAN, the Internet, or digital satellite broadcasting.

The program can be installed in the storage unit 908 via the input and output interface 905 by mounting the removable media 911 in the drive 910. Also, the program may be received using the communication unit 909 via a wired or wireless transmission medium and be installed in the storage unit 908. In addition, the program may be installed in the ROM 902 or the storage unit 908 in advance.

The program executed by the computer may be a program where processes are performed in a time series according to the order described in this specification, or may be a program executed in parallel therewith or a program where processes are performed at a necessary timing such as when accessed.

The present application contains subject matter related to that disclosed in Japanese Priority Patent Application JP 2010-079186 filed in the Japan Patent Office on Mar. 30, 2010, the entire contents of which are hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing device comprising:
  recording control processing circuitry configured to control recording of an image of a predetermined frame among images of a plurality of consecutive frames;
  trim box setting processing circuitry configured to set a plurality of trim boxes containing a subject area which is an area of a subject of interest in the image of the predetermined frame recorded by the recording control processing circuitry; and
  generation control processing circuitry configured to control generation of a plurality of trim images from the image of the predetermined frame recorded by the recording control processing circuitry, based on the plurality of trim boxes set by the trim box setting processing circuitry, wherein
  the trim box setting processing circuitry is configured to set the number of trim boxes according to at least one of a size and a position of the subject area in the image of the predetermined frame recorded by the recording control processing circuitry, and
  the trim box setting processing circuitry is configured to set a smaller number of trim boxes if the subject area is larger than the image, and to set a larger number of trim boxes if the subject area is smaller than the image, in the image of the predetermined frame.

2. The image processing device according to claim 1, further comprising:
  image capturing circuitry configured to capture an image of a subject; and
  instruction processing circuitry configured to instruct the image capturing circuitry to capture the image of the predetermined frame when the subject area is positioned around a center of the image of the predetermined frame in the image of the predetermined frame,
  wherein the recording control processing circuitry is configured to control recording of the image of the predetermined frame captured by the image capturing circuitry in response to the instruction from the instruction processing circuitry.

3. The image processing device according to claim 1, further comprising determination processing circuitry configured to determine a facial expression of a figure if the subject is a figure,
  wherein the trim box setting processing circuitry is configured to set the number of trim boxes according to the facial expression determined by the determination processing circuitry and a position of the subject area in the image of the predetermined frame.

4. An image processing method for an image processing device including a recording control processing circuitry that controls recording of an image of a predetermined frame among images of a plurality of consecutive frames, a trim box setting processing circuitry that sets a plurality of trim boxes containing a subject area which is an area of a subject of interest in the image of the predetermined frame recorded by the recording control processing circuitry, and a generation control processing circuitry that controls generation of a plurality of trim images from the image of the predetermined frame recorded by the recording control processing circuitry, based on the plurality of trim boxes set by the trim box setting processing circuitry, the method comprising the steps of:
- controlling, by the recording control processing circuitry, recording of an image of a predetermined frame among images of the plurality of consecutive frames;
- setting, by the trim box setting processing circuitry, the plurality of trim boxes containing the subject area which is an area of a subject of interest in the image of the predetermined frame recorded in the controlling of recording step; and
- controlling, by the generation control processing circuitry, generation of the plurality of trim images from the image of the predetermined frame recorded in the controlling of recording step, based on the plurality of trim boxes set in the setting step, wherein
- the setting step further includes setting the number of trim boxes according to at least one of a size and a position of the subject area in the image of the predetermined frame recorded in the controlling of recording step, and
- the setting step further includes setting a smaller number of trim boxes if the subject area is larger than the image, and setting a larger number of trim boxes if the subject area is smaller than the image, in the image of the predetermined frame.

5. A non-transitory computer-readable storage medium including computer executable instructions, wherein the instructions, when executed by a computer, cause the computer to perform a method, the method comprising:
- controlling recording of an image of a predetermined frame among images of a plurality of consecutive frames;
- setting a plurality of trim boxes containing a subject area which is an area of a subject of interest in the image of the predetermined frame recorded in the controlling of recording step; and
- controlling generation of a plurality of trim images from the image of the predetermined frame recorded in the controlling of recording step, based on the plurality of trim boxes set in the setting step, wherein
- the setting step further includes setting the number of trim boxes according to at least one of a size and a position of the subject area in the image of the predetermined frame recorded in the controlling of recording step, and
- the setting step further includes setting a smaller number of trim boxes if the subject area is larger than the image, and setting a larger number of trim boxes if the subject area is smaller than the image, in the image of the predetermined frame.

6. An image processing device comprising:
- recording control means for controlling recording of an image of a predetermined frame among images of a plurality of consecutive frames;
- trim box setting means for setting a plurality of trim boxes containing a subject area which is an area of a subject of interest in the image of the predetermined frame recorded by the recording control means; and
- generation control means for controlling generation of a plurality of trim images from the image of the predetermined frame recorded by the recording control means, based on the plurality of trim boxes set by the trim box setting means, wherein
- the trim box setting means sets the number of trim boxes according to at least one of a size and a position of the subject area in the image of the predetermined frame recorded by the recording control means, and
- the trim box setting means sets a smaller number of trim boxes if the subject area is larger than the image, and to set a larger number of trim boxes if the subject area is smaller than the image, in the image of the predetermined frame.

\* \* \* \* \*